(12) United States Patent
Song et al.

(10) Patent No.: US 11,660,990 B1
(45) Date of Patent: May 30, 2023

(54) LUMBAR SUPPORT FOR VEHICLE SEAT

(71) Applicant: GUMCHANG CO.,LTD., Yeongcheon-si (KR)

(72) Inventors: Jae Yel Song, Daegu (KR); Hai Tai Choi, Gyeongsan-si (KR); Chae Sung Song, Daegu (KR); Se Gil Shin, Daegu (KR); Sung Su Park, Yeongcheon-si (KR); Sang Ho Lee, Daegu (KR); Man Gi Lee, Pohang-si (KR); Se Jong Kim, Daegu (KR); Yong Choi, Ulsan (KR); Young Jin Hong, Suwon-si (KR)

(73) Assignee: GUMCHANG CO., LTD., Yeongcheon-si (KR)

( * ) Notice: Subject to any disclaimer, the term of this patent is extended or adjusted under 35 U.S.C. 154(b) by 0 days.

(21) Appl. No.: 17/646,074

(22) Filed: Dec. 27, 2021

(30) Foreign Application Priority Data

Dec. 10, 2021 (KR) .......................... 10-2021-0176288
Dec. 14, 2021 (KR) .......................... 10-2021-0178293

(51) Int. Cl.
*B60N 2/66* (2006.01)

(52) U.S. Cl.
CPC .................................... *B60N 2/666* (2015.04)

(58) Field of Classification Search
CPC ........ B60N 2/666; B60N 2/667; B60N 2/6673
See application file for complete search history.

(56) References Cited

U.S. PATENT DOCUMENTS

| 2018/0015860 A1* | 1/2018 | Bhatia | B60N 2/753 |
| 2020/0189429 A1* | 6/2020 | Lee | B60N 2/666 |
| 2022/0134922 A1* | 5/2022 | Funaki | B60N 2/66 |
| | | | 297/284.4 |

FOREIGN PATENT DOCUMENTS

| JP | 2013504463 A | * | 2/2013 | |
| KR | 10-0636402 B1 | | 10/2006 | |
| KR | 10-1372957 B1 | | 3/2014 | |
| KR | 20180061582 A | * | 6/2018 | |
| KR | 10-1986536 B1 | | 6/2019 | |
| KR | 10-2102950 B1 | | 4/2020 | |
| WO | WO-2015106338 A1 | * | 7/2015 | ............... B60N 2/02 |
| WO | WO-2017022492 A1 | * | 2/2017 | ............... A47C 7/46 |
| WO | WO-2017022493 A1 | * | 2/2017 | ............. B60N 2/666 |
| WO | WO-2018202679 A1 | * | 11/2018 | ............. B60N 2/666 |

* cited by examiner

*Primary Examiner* — Timothy J Brindley
(74) *Attorney, Agent, or Firm* — Sughrue Mion, PLLC

(57) ABSTRACT

A lumbar support for a vehicle seat includes: a support panel made of an elastic material and supporting the user's lumbar vertebra; a first guide rod supporting the support panel; a second link bracket fastened to the first guide rod to be movable up and down; a first link bracket disposed under the second link bracket to be movable up and down with respect to the second link bracket, and having an operation block providing a supporting force to the lumbar vertebra; a first rotary screw vertically extending, thread-fastened to the first link bracket, and moving up and down the first link bracket by rotating about a longitudinal axis; and a second rotary screw vertically extending, thread-fastened to the second link bracket, and moving up and down the second link bracket by rotating about a longitudinal axis.

13 Claims, 15 Drawing Sheets

LUMBAR SUPPORT FOR VEHICLE SEAT

CROSS REFERENCE TO RELATED APPLICATIONS

This application claims priority based on Korean Patent Application No. 10-2021-0176288 filed Dec. 10, 2021 and Korean Patent Application No. 10-2021-0178293 filed Dec. 14, 2021, of which contents are incorporated herein by reference in their entireties.

BACKGROUND

Field

The present invention relates to a lumbar support for a vehicle seat, the lumbar support disposed in a vehicle seat and used to support the user's lumbar vertebra.

Description of the Related Art

A vehicle seat is configured to be able to appropriately adjust the position, the angle, the posture, etc. in accordance with the physical condition of a user. As one of the components, a lumbar support that supports the user's lumbar vertebra is disposed in a vehicle seat. A lumbar support provides an appropriate supporting force to the lumbar vertebra, thereby being able to provide effects such as improvement of the feeling of seating and reduction of fatigue due to long-time riding.

Various types of lumbar supports have been known and are being used. Some lumbar supports are configured such that the position or the protruding amount can be adjusted in accordance with the physical conditions, posture, etc. of users. For example, a lumbar plate that is elastically deformed forward and rearward has been disclosed in Korean Patent No. 10-1372957, and a configuration in which the protruding amount of a support plate can be adjusted through a kind of rack-pinion structure has been disclosed in Korean Patent No. 10-0636402.

Even though various types have been known, lumbar supports for better seating comfort, feeling of operation, etc. are being developed. For example, the applicant(s) has filed and registered a belt-extendible lumbar support using a rack-pinion structure in Korean Patent No. 10-1986536 and has filed and registered a lumbar support that can achieve more precise and smooth operation using a pulling wheel and a wire in Korean Patent No. 10-2102950.

CITATION LIST

Patent Literature

Patent Literature 1: Korean Patent No. 10-1372957 (registered, Mar. 10, 2014)
Patent Literature 2: Korean Patent No. 10-0636402 (registered, Oct. 12, 2006)
Patent Literature 3: Korean Patent No. 10-1986536 (registered, May 31, 2019)
Patent Literature 2: Korean Patent No. 10-2102950 (registered, Apr. 14, 2020)

SUMMARY OF THE INVENTION

Embodiments of the present disclosure provide a lumbar support for a vehicle seat which is installed in a seat of a vehicle and can appropriately support the user's lumbar vertebra.

Further, embodiments of the present disclosure provide a lumbar support for a vehicle seat which can further improve a feeling of operation and achieve more various motions in comparison to the related art.

Further, embodiments of the present disclosure provide a lumbar support for a vehicle seat which has a stable load support structure, thereby being able to minimize damage or deformation due to long-time use.

However, objectives intended to be achieved by embodiments of the present disclosure are not limited to the objectives described above. Other objectives not stated here may be clearly understood to those skilled in the art from other descriptions in the specification including the detailed description.

According to a first aspect of the present disclosure, there may be provided a lumbar support for a vehicle seat which includes: a support panel made of an elastic material and supporting the user's lumbar vertebra; a first guide rod supporting the support panel; a second link bracket fastened to the first guide rod to be movable up and down; a first link bracket disposed under the second link bracket to be movable up and down with respect to the second link bracket, and having an operation block providing a supporting force to the lumbar vertebra; a first rotary screw vertically extending, thread-fastened to the first link bracket, and moving up and down the first link bracket by rotating about a longitudinal axis; and a second rotary screw vertically extending, thread-fastened to the second link bracket, and moving up and down the second link bracket by rotating about a longitudinal axis.

According to a second aspect of the present disclosure, there may be provided a lumbar support for a vehicle seat which includes: a support panel made of an elastic material and supporting the user's lumbar vertebra; a first guide rod supporting the support panel; a second link bracket fastened to the first guide rod to be movable up and down; a supporting rod rotatably fastened to the second link bracket; a first link bracket supported at the second link bracket to be movable up and down, supporting the supporting rod from behind, and adjusting a rotation position of the supporting rod; a first rotary screw vertically extending, thread-fastened to the first link bracket, and moving up and down the first link bracket by rotating about a longitudinal axis; and a second rotary screw vertically extending, thread-fastened to the second link bracket, and moving up and down the second link bracket by rotating about a longitudinal axis.

DETAILED DESCRIPTION OF THE PREFERRED EMBODIMENTS

Hereafter, embodiments of the present disclosure are described in detail with reference to the accompanying drawings. The following embodiments may be provided to more completely explain the present disclosure to those skilled in the art. However, the following embodiments are provided to help understand the present disclosure and the spirit of the present disclosure is not necessarily limited to the following embodiments. Components that make the subject of the present disclosure unclear or that have been well known in the art are not described in detail.

Figure 1:
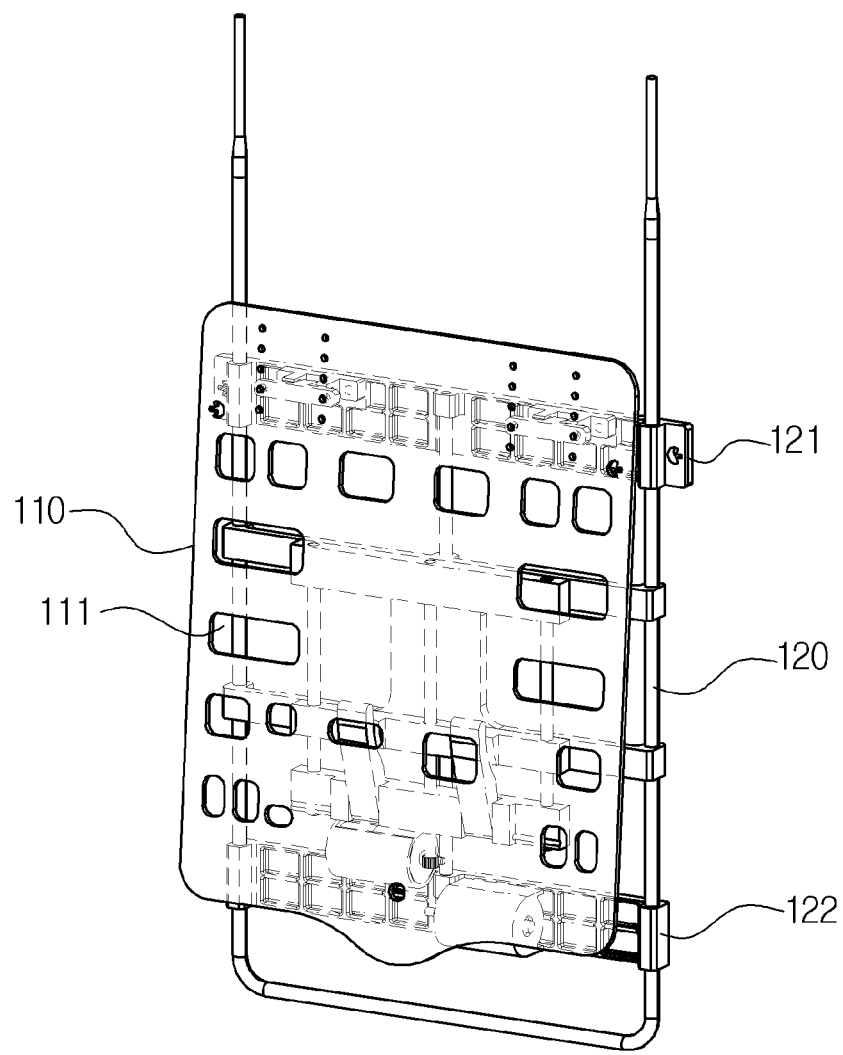
FIG. 1 is a schematic perspective view of a lumbar support for a vehicle seat according to a first embodiment of the present disclosure seen from the front.
Figure 2:
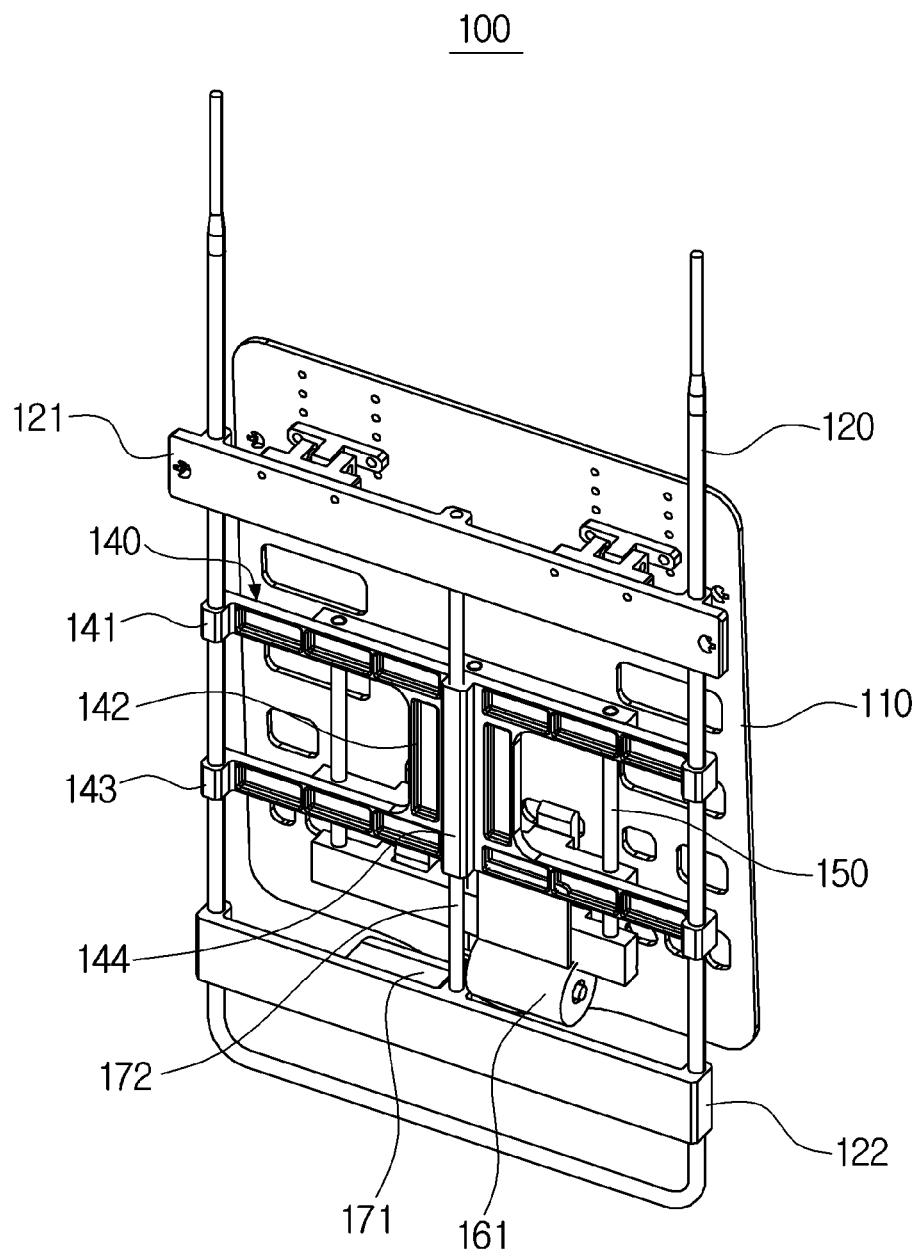
FIG. 2 is a schematic perspective view of the lumbar support for a vehicle seat of FIG. 1 seen from the rear.
Figure 3:
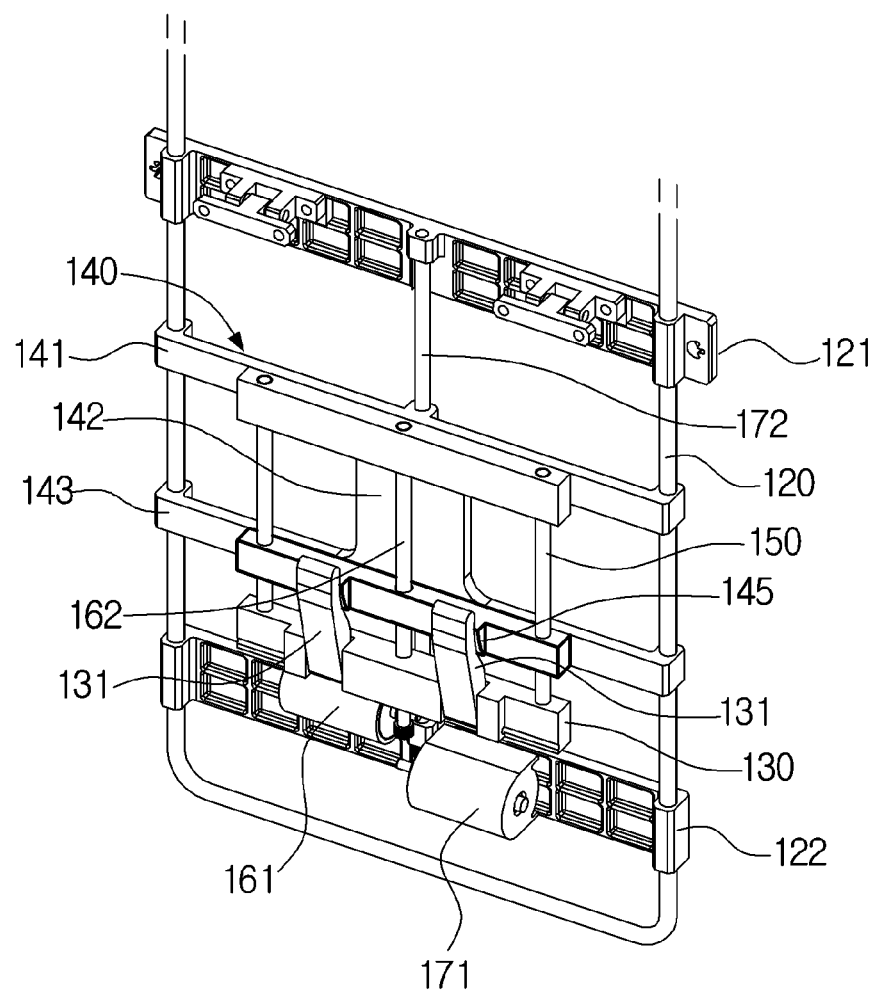
FIG. 3 is a schematic perspective view of the lumbar support for a vehicle seat of FIG. 1 with a support panel removed.

FIG. 1 is a schematic perspective view of a lumbar support for a vehicle seat according to a first embodiment of the present disclosure seen from the front. FIG. 2 is a schematic perspective view of the lumbar support for a vehicle seat of FIG. 1 seen from the rear. FIG. 3 is a schematic perspective view of the lumbar support for a vehicle seat of FIG. 1 with a support panel removed.

Referring to FIGS. 1 to 3, a lumbar support 100 for a vehicle seat of the embodiment may include a support panel 110.

The support panel 110 can provide a supporting structure for supporting the user's lumbar vertebra or back. The support panel 110 may extend with a predetermined supporting surface to correspond to the user's lumbar vertebra or back. In the embodiment, it is exemplified that the support panel 110 has a rectangular plate shape having a predetermined vertical height and lateral width. The support panel 110 may extend up/down and left/right to support the user's lumbar vertebra and back in contact with them with a sufficiently large area. This is for performing the conversion to be described below with a lumbar vertebra stably supported with a large contact area.

If necessary, a panel hole 111 may be formed at the support panel 110. The panel hole 111 may be formed through the support panel 110 in the thickness direction of the support panel 110. A plurality of panel holes 111 may be formed and may be appropriately spaced up and down or left and right on the plane of the support panel 110. Preferably, the panel holes 111 may have a position, size, shape, etc. that can induce appropriate deformation of the support panel 110 to correspond to elastic deformation of the support panel 110 by an operation block 131 to be described below. However, the number, position, size, shape, etc. of the panel holes 111 may be appropriately changed, if necessary, and are not necessarily limited to the examples. Alternatively, depending on cases, the panel holes 110 may be replaced with shapes, materials, structures, etc. that can induce deformation of the support panel 110.

The support panel 110 may be made of an elastic member that can be partially or entirely deformed. Preferably, the entire support panel 110 may be made of one elastic material. The support panel 110 made of an elastic material can be elastically deformed by the operation block 131 to be described below. The support panel 110 entirely made of one elastic material reduces a sense of difference when the operation block 131 is moved, thereby being able to contribute to achieving a smooth feeling of use.

The rear surface of the support panel 110 may be supported by the operation block 131 to be described below in a contact state. Accordingly, the support panel 110 elastically deforms to protrude at the position where it is supported by the operation block 131, thereby being able to provide a supporting force for the user's lumbar vertebra. When the operation block 131 is moved, the support panel 110 may support different parts while changing the protruding position.

Meanwhile, the lumbar support 100 for a vehicle seat of the embodiment may include a first guide rod 120.

The first guide rod 120 may be disposed behind the support panel 110 and may provide a supporting structure for supporting the load of the support panel 110 and a user. The first guide rod 120 may be a rod or a frame extending in a predetermined shape. In this embodiment, first guide rods 120 vertically extending a predetermined length are provided in a pair and spaced left and right apart from each other and the lower ends of the pair of rods are connected left and right, thereby forming a substantially U-shape. However, the structure, shape, etc. of the first guide rod 120 is not necessarily limited thereto, and the first guide rod 120 may be changed in various structures, shapes, etc. as long as they can appropriately perform the function of the first guide rod 120 to be described below. Depending on cases, the first guide rod 120 may be replaced with a frame, a bracket, etc.

An upper frame 121 and a lower frame 122 are disposed at the upper and lower portions of the first guide rod 120, respectively. The upper frame 121 may have a predetermined height, may extend left and right, and may be fastened to the upper end portion of the first guide rod 120. The lower frame 122 may be disposed at a predetermined distance downward from the upper frame 121 and may be fastened to the lower end portion of the first guide rod 120. The upper and lower frames 121 and 122 may provide a supporting structure on which components such as a rotary screw and a driving motor to be described below can be appropriately mounted and supported. The structure, shape, etc. of the upper and lower frames 121 and 122 are not necessarily limited to the examples, and, depending on cases, the upper and lower frames 121 and 122 may be partially or entirely integrated with the first guide rod 120.

Meanwhile, the lumbar support 100 for a vehicle seat of the embodiment may include a first link bracket 130.

The first link bracket 130 may be disposed at a lower portion of the first guide rod 120 substantially adjacent to the lower frame 122. The first link bracket 130 can be supported by the first guide rod 120 through a second link bracket 140 to be described below and may be moved up and down by operation of a first rotary screw 162 to be described below. The first link bracket 130 can adjust the protruding amount at the portion supporting a lumbar vertebra by moving up and down with respect to the second link bracket 140.

Figure 4:
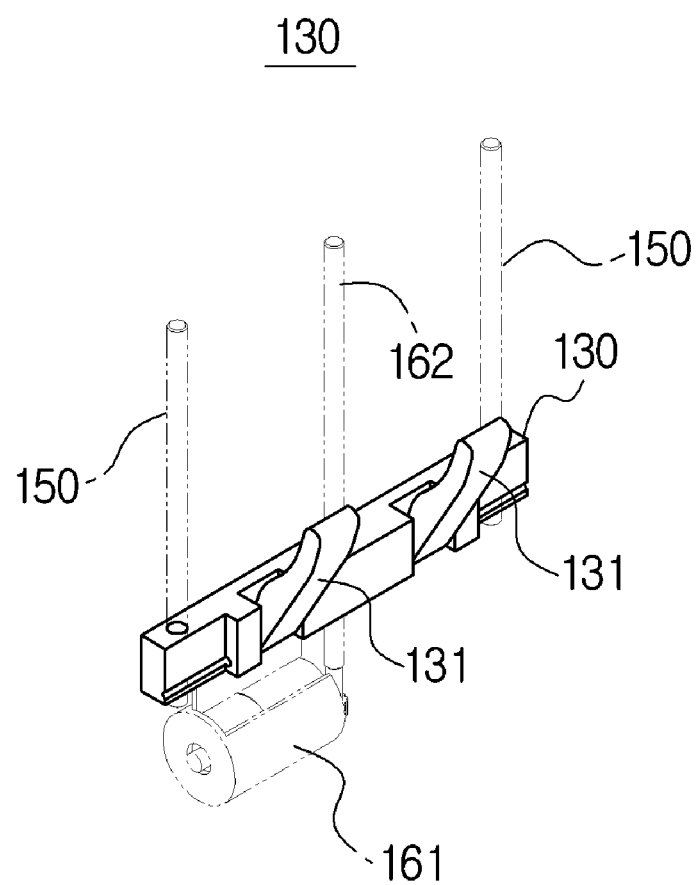
FIG. 4 is a schematic perspective view of a first link bracket shown in FIG. 1.

FIG. 4 is a schematic perspective view of a first link bracket shown in FIG. 1.

Referring to FIG. 4, the first link bracket 130 may extend a predetermined length left and right. The second guide rod 150 to be described below may be fastened to the left and right of the first link bracket 130, respectively. The second guide rods 150 are fastened vertically through the first link bracket 130, thereby being able to guide vertical movement of the first link bracket 130.

The first link bracket 130 may have the operation block 131. The lower end of the operation block 131 may be hinged to the first link bracket 130, whereby the operation block 131 can rotate about a left-right shaft. The operation block 131 may extend a predetermined distance upward from the hinge shaft. The front surface of the upper end of the operation block 131 can support the rear surface of the support panel 110 in contact with it, and the rear surface thereof can be supported in contact with a push protrusion 145. The rear surface may be an inclined surface that is inclined downward rearward such that the operation block 131 can be protruded forward by the push protrusion 145.

The operation block 131 may be provided left and right in a pair with a gap therebetween. Preferably, the operation blocks 131 provided in a pair may be spaced a predetermined distance apart from each other left and right from a lateral center of the first link bracket 130. This arrangement makes the pair of operation blocks 131 support corresponding parts left and right with the user's lumbar vertebra therebetween, whereby it is possible to reduce a sense of difference and achieve a more comfortable feeling of use.

Referring to FIGS. 1 to 3, a lumbar support 100 for a vehicle seat of the embodiment may include a second link bracket 140.

The second link bracket 140 is disposed over the first link bracket 130 and supports the first link bracket 130 through the second guide rod 150. The left and right ends of the second link bracket 140 are fastened to the first guide rods 120, respectively, so the second link bracket 140 can be guided up and down by the first guide rods 120. The second link bracket 130 can appropriately adjust the vertical positions where it supports a lumbar vertebra by moving up and down with the first link bracket 130.

Figure 5:
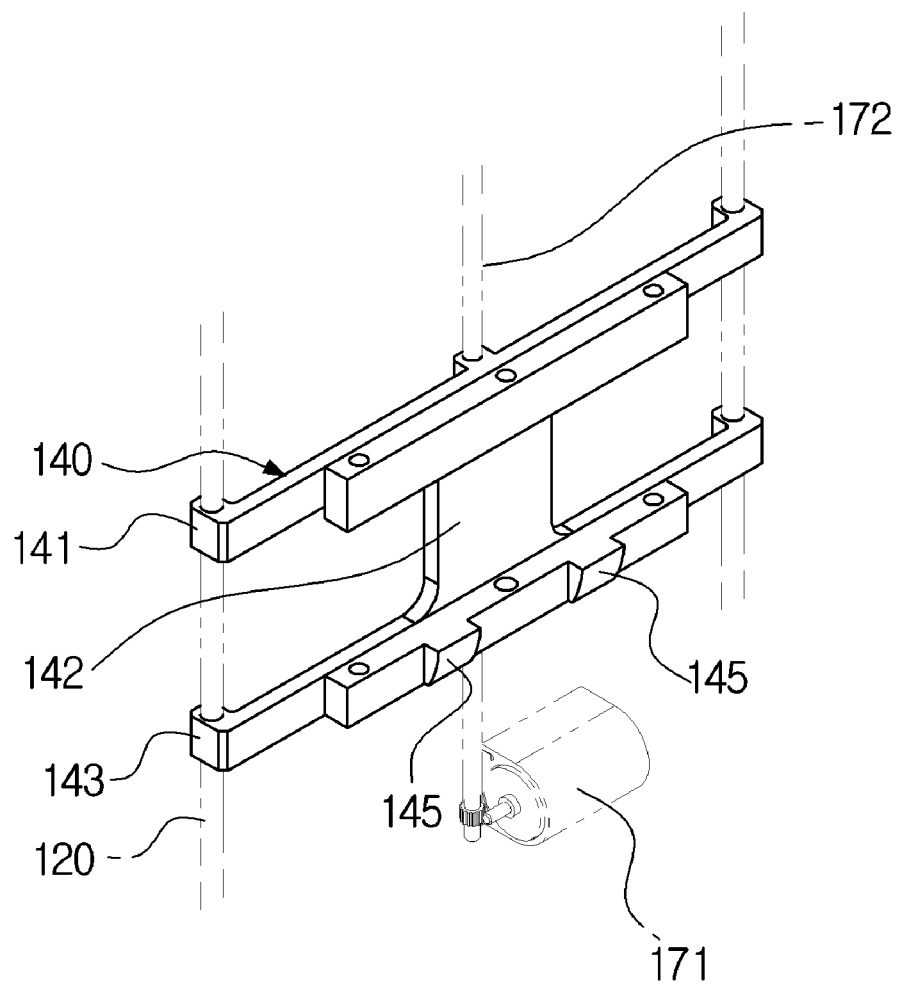
FIG. 5 is a schematic perspective view of a second link bracket shown in FIG. 1.

FIG. 5 is a schematic perspective view of the second link bracket shown in FIG. 1.

Referring to FIG. 5, the second link bracket 140 may include an upper link bracket 141, a connection bracket 142, and a lower link bracket 143. The upper and lower link brackets 141 and 143 may be vertically spaced a predetermined gap apart from each other, and the connection bracket 142 may extend up and down between the upper and lower link brackets 141 and 143 and may connect the upper and lower link brackets 141 and 143. The connection bracket 142 may vertically extend with a predetermined lateral width substantially at the lateral center of the upper and lower link brackets 141 and 143. However, the detailed shape of the second link bracket 140 may be appropriately changed in various shapes other than the exemplified one as long as they have the functional conditions to be described below, and is not necessarily limited to the exemplified shape.

The left and right ends of the upper link bracket 141 may be fastened to the first guide rods 120, respectively. The first guide rods 120 are fastened vertically through the upper link bracket 141, thereby being able to guide vertical movement of the upper link bracket 141. Similarly, the lower link bracket 143 may be spaced a predetermined gap downward from the upper link bracket 141 with the left and right ends fastened to the first guide rods 120, respectively. Accordingly, the second link bracket 140 can be moved up and down with the left and right ends supported by the first guide rods 120 at the upper and lower positions. This structure enables the portion for supporting the lumbar vertebra to be moved with a stable supporting force secured in a larger area, so it is possible to achieve a feeling of smooth and stable operation.

A screw fastening bracket 144 may vertically extend on the rear surface of the second link bracket 140 (see FIG. 2). The screw fastening bracket 144 may vertically extend along the connection bracket 142 at the lateral center of the second link bracket 140. A second rotary screw 172 to be described below may be thread-fastened vertically through the center of the screw fastening bracket 144. Accordingly, the screw fastening bracket 144 and the second link bracket 140 can be appropriately moved up and down by operation of the second rotary screw 172.

Since the screw fastening bracket 144 vertically extends, it receives an operation force with a sufficient supporting area secured with the second rotary screw 172. This configuration was designed in consideration of the second link bracket 140 supporting the lumbar vertebra or back of a user in a relatively large area and receiving relatively large load. That is, since the push protrusion 145 is moved with the user's load sufficiently and stably supported by the screw fastening bracket 144, the lumbar support 100 for a vehicle seat of this embodiment can achieve a feeling of more smooth and stable operation.

The push protrusion 145 may be provided on the front surface of the lower link bracket 143. The push protrusion 145 may be provided left and right in a pair to correspond to the pair of operation blocks 131. The push protrusions 145 can support the rear surface of the operation block 131 in contact with it, and may be inclined downward forward to correspond to the inclination of the rear surface of the operation block 131. The push protrusions 145 can adjust the protruding amount of the operation block 131 by sliding in contact with the rear surface of the operation block 131. This will be described more in relation to the operation of this embodiment.

Referring to FIGS. 1 to 3, the lumbar support 100 for a vehicle seat of the embodiment may include a second guide rod 150.

The second guide rod 150 may be formed in a rod shape vertically extending. The second guide rod 150 may be fastened to the upper link bracket 141 at the upper end and may be fastened to the lower link bracket 143 at a position spaced a predetermined gap downward from the upper end. The second guide rod 150 may be fixed and supported by being fastened to the upper and lower link brackets 141 and 143.

The first link bracket 130 may be fastened to the lower end of the second guide rod 150. The second guide rod 150 is fastened vertically through the first link bracket 130, whereby the first link bracket 130 can be guided up and down by the second guide rod 150. That is, the second guide rod 150 can guide vertical movement of the first link bracket 130.

The second guide rod 150 may be provided in a pair and spaced left and right apart from each other. Accordingly, the first link bracket 130 can be supported and guided up and down at both of the left and right sides by the second guide rods 150. Accordingly, the first link bracket 130 and the operation block 131 can be more stably and smoothly moved with the load of a user applied.

Meanwhile, the lumbar support 100 for a vehicle seat of the embodiment may include a first driving motor 161 and a first rotary screw 162.

The first driving motor 161 may be disposed under the first link bracket 130 and mounted and supported on the second link bracket 140. The first driving motor 161 may be moved up and down with vertical movement of the second link bracket 140. The first driving motor 161 is linked with the first rotary screw 162, thereby being able to rotate the first rotary screw 162. The first rotary screw 162 may be rotated forward or backward about the longitudinal axis by the first driving motor 161.

If necessary, the first driving motor 161 has an appropriate reducer on the rotary shaft thereof, thereby being able to transmit a driving force to the first rotary screw 162 through the reducer. For example, the first driving motor 161 may have a lateral rotary shaft, and a worm engaged with the first rotary screw 162 to transmit a driving force may be disposed at the end of the rotary shaft. This arrangement makes it possible to more easily dispose the first driving motor 161 and achieve a sufficient reduction ratio through the worm.

However, the first driving motor 161 may have various positions, power transmission structures, etc. other than the exemplified one as long as it can transmit appropriate torque to the first rotary screw 162, and is not necessarily limited to the exemplified arrangement, power transmission structure, etc.

The first rotary screw 162 may be fastened vertically through the first link bracket 130 substantially at the lateral center of the first link bracket 130. The first rotary screw 162 may be thread-fastened to the first link bracket 130. Accordingly, the first link bracket 130 may be moved up and down when the first rotary screw 162 is rotated forward or backward, whereby the position can be adjusted. The first link bracket 130 receives a driving force at the lateral center through the first rotary screw 162 and is guided up and down by the second guide rods 150 at the left and right sides, whereby it can be moved up and down while maintaining a stable supporting structure.

The first rotary screw 162 may vertically extend a predetermined length, and the lower end thereof may be connected to the first driving motor 161 to receive torque. An appropriate reducer, etc. may be provided, if necessary, between the lower end of the first rotary screw 162 and the first driving motor 161. The first rotary screw 162 may extend upward from the lower end and may be thread-fastened through the first link bracket 130, and may be fastened to the second link bracket 140 over the first link bracket 130. The first rotary screw 162 may be rotatably supported by the second link bracket 140 to be able to be appropriately rotated by the first driving motor 161.

If necessary, the first rotary screw 162 may be fastened through the upper and lower link bracket 141 and 143, which are vertically spaced apart from each other, and may be mounted and supported through a predetermined rotation support such as a bearing. In this case, the first rotary screw 162 is supported by the first link bracket 130 at the lower portion, the upper link bracket 141 at the upper portion, and the lower link bracket 143 at the middle portion, whereby the first link bracket 130 can be moved up and down in a more stably supported state.

Meanwhile, the lumbar support 100 for a vehicle seat of the embodiment may include a second driving motor 171 and a second rotary screw 172.

The second driving motor 171 may be disposed on the lower frame 122. Alternatively, the second driving motor 171 may be disposed at a predetermined position separated from the first and second link bracket 130 and 140. For example, the second driving motor 171, unlike that shown in the figures, may be disposed on the upper frame 121 or may be disposed at a side in the longitudinal direction of the second rotary screw 172 through a predetermined supporting structure. Similar to the first driving motor 161 described above, the second driving motor 171 has only to appropriately transmit torque to the second rotary screw at a predetermined position separated from the first and second link brackets 130 and 140. If necessary, an appropriate reducer may be disposed on the rotary shaft of the second driving motor 171.

The second rotary screw 172 may be fastened vertically through the second link bracket 140 substantially at the lateral center of the second link bracket 140. As described above, if necessary, a screw fastening bracket 144 may be disposed on the rear surface of the second link bracket 140, and the second rotary screw 172 may be fastened vertically through the screw fastening bracket 144. The second rotary screw 172 may be thread-fastened vertically through the screw fastening bracket 144.

The second rotary screw 172 may vertically extend a predetermined length and the lower end thereof may be connected to the second driving motor 171 to receive torque. For reference, referring to the figures, the first rotary screw 162 is relatively short and disposed ahead of the second rotary screw 172, and the second rotary screw 172 is longer than the first rotary screw 162 and disposed behind the first rotary screw 162. The upper end of the second rotary screw 172 may be rotatably fastened to the center of the upper frame 121 and the lower end thereof may be rotatably fastened to the center of the lower frame 122. Accordingly, the second rotary screw 172 can be rotated while being appropriately supported at the upper and lower end support points and the middle portion fastened to the screw fastening bracket 144.

Figure 6:
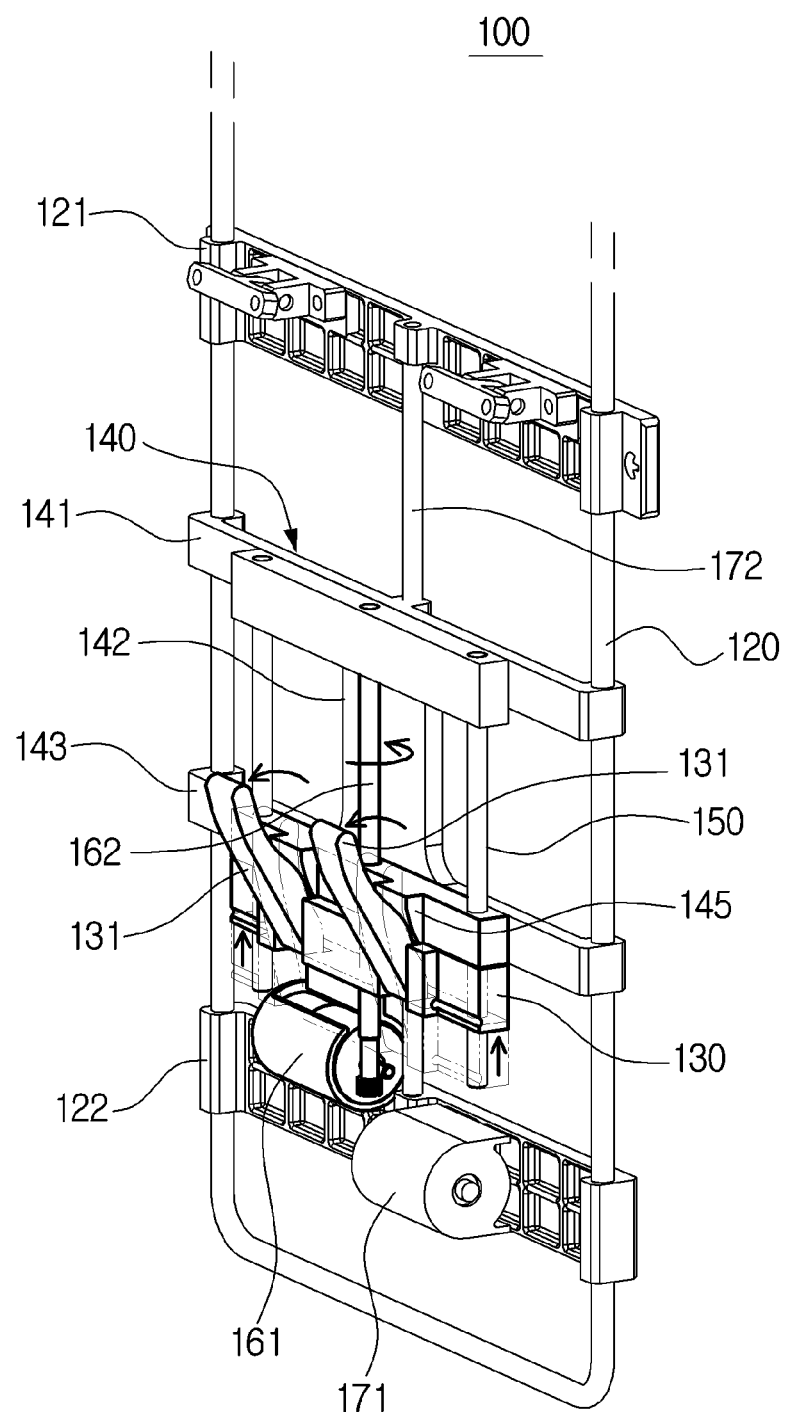
FIG. 6 is a first operation view showing adjustment of protruding amount of an operation block of the lumbar support for a vehicle seat shown in FIG. 3.

FIG. 6 is a first operation view showing adjustment of protruding amount of an operation block of the lumbar support for a vehicle seat shown in FIG. 3.

Referring to FIG. 6, the lumbar support 100 for a vehicle seat of this embodiment can adjust the protruding amount of the operation block 131 by operating the first driving motor 161. The operation block 131 can increase the supporting force for a lumbar vertebra by protruding forward or can decrease the supporting force by moving backward.

In detail, when the first driving motor 161 is driven forward, the first rotary screw 162 may rotate forward about the longitudinal axis. When the first rotary screw 162 is rotated forward, the first link bracket 130 thread-fastened thereto can be moved upward. In this process, only the first link bracket 130 can be moved upward with the second link bracket 140 vertically fixed.

When the first link bracket 130 is moved upward, the rear surface of the operation block 131 is pushed by the push protrusion 145, whereby the operation block 131 can be rotated forward by a predetermined amount about the hinge shaft. That is, the operation block 131 protrudes forward, so the supporting force for the lumbar vertebra can be increased. The contact surface between the operation block 131 and the push protrusion 145 is an inclined surface, as described above, so when the first link bracket 130 is moved upward, the operation block 131 can protrude forward. Accordingly, a user can appropriately change the protruding amount and the supporting force by adjusting the vertical position of the first link bracket 130.

The operation block 131 is provided left and right in a pair, thereby being able to support the waist of a user except for the lumbar vertebra at the center. Further, the operation blocks 131 are moved up and down in this disposed and supported state, whereby it is possible to achieve a more comfortable feeling of use.

When the first driving motor 161 is driven backward, the first rotary screw 162 can be rotated backward, whereby the first link bracket 130 can be moved downward. Further, the push protrusion 145 can be moved rearward by a predetermined amount, so the forward protruding amount decreases and the supporting force for the lumbar vertebra can be decreased. In this way, a user can appropriately adjust the supporting force for the lumbar vertebra by driving the first driving motor 161 forward or backward.

Figure 7:
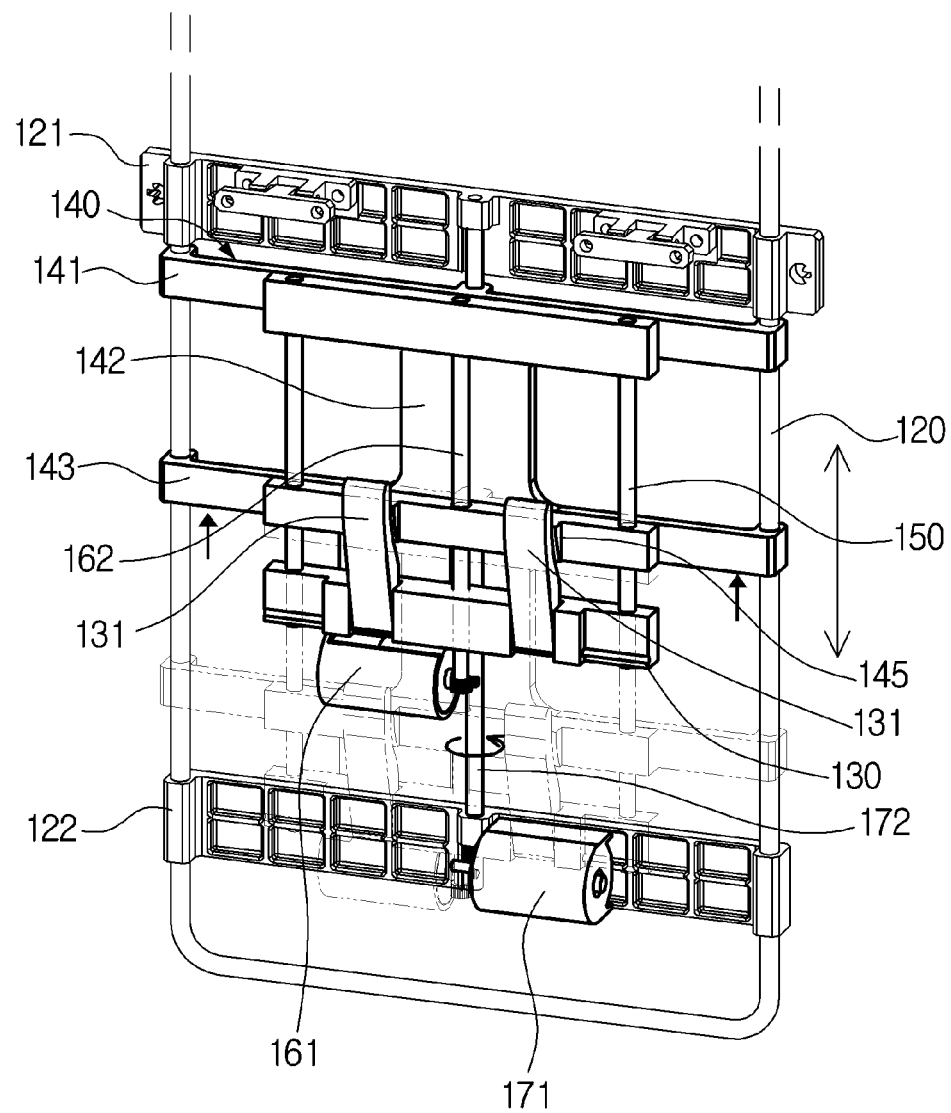
FIG. 7 is a second operation view showing up/down movement of an operation block of the lumbar support for a vehicle seat shown in FIG. 3.

FIG. 7 is a second operation view showing up/down movement of an operation block of the lumbar support for a vehicle seat shown in FIG. 3.

Referring to FIG. 7, the lumbar support 100 for a vehicle seat of this embodiment can vertically adjust the supporting positions by operating the second driving motor 171. The operation block 131 is moved up and down by the second driving motor 171 while maintaining the predetermined protruding amount, whereby the position thereof can be adjusted. Accordingly, a user can adjust the supporting position in accordance with the body shape, etc.

In detail, when the second driving motor 171 is rotated forward, the second rotary screw 172 may rotate forward about the longitudinal axis. When the second rotary screw 172 is rotated forward, the screw fastening bracket 144 and the second link bracket 140 that are thread-fastened thereto can be moved upward. The first link bracket 130 can be moved upward with the second link bracket 140 along the first rotary screw 162, so the protruding amount of the operation block 131 can be maintained.

When the first link bracket 130 and the operation block 131 are moved upward, the supporting positions can be entirely moved upward. Similar to the adjustment of protruding amount described above, the operation block 131 is provided left and right in a pair and supports the waist at the left and right, so a more comfortable feeling of use can be achieved when the operation blocks are moved up and down.

When the second driving motor 171 is driven backward, the second rotary screw 172 can be rotated backward, whereby the second link bracket 140 and the operation blocks 131 can be entirely moved downward. Accordingly, the supporting positions are moved downward, so it is possible to appropriately adjust the supporting positions in accordance with users.

As described above, the lumbar support 100 for a vehicle seat according to embodiments of the present disclosure can be installed at a seat of a vehicle and can provide an appropriate supporting force for the user's lumbar vertebra.

Further, the lumbar support 100 for a vehicle seat according to embodiments of the present disclosure can appropriately adjust the protruding amount or vertical position of the supporting portions in accordance with the body shape, posture, etc. of a user, which can contribute to improving the feeling of seating and convenience of use.

The lumbar support 100 for a vehicle seat according to embodiments of the present disclosure is configured such that the first link bracket 130 is guided by the left and right second guide rods 150 and receives an operation force through the first rotary screw 162 at the center and the second link bracket 140 is guided by the left and right second guide rods 150 and receives an operation force through the second rotary screw 172 at the center. Accordingly, the protruding amount or vertical position can be adjusted while a stably supported state is maintained and shaking or rattling is reduced when it is operated, thereby achieving a smoother feeling of operation.

In the lumbar support 100 for a vehicle seat according to embodiments of the present disclosure, the protruding amount or vertical position can be adjusted with the pair of left and right operation blocks 131 supporting the corresponding portions except for the lumbar vertebra at the center, so it is possible to reduce the sense of difference and achieve a more comfortable feeling of use when adjusting the vertical position.

Figure 8:
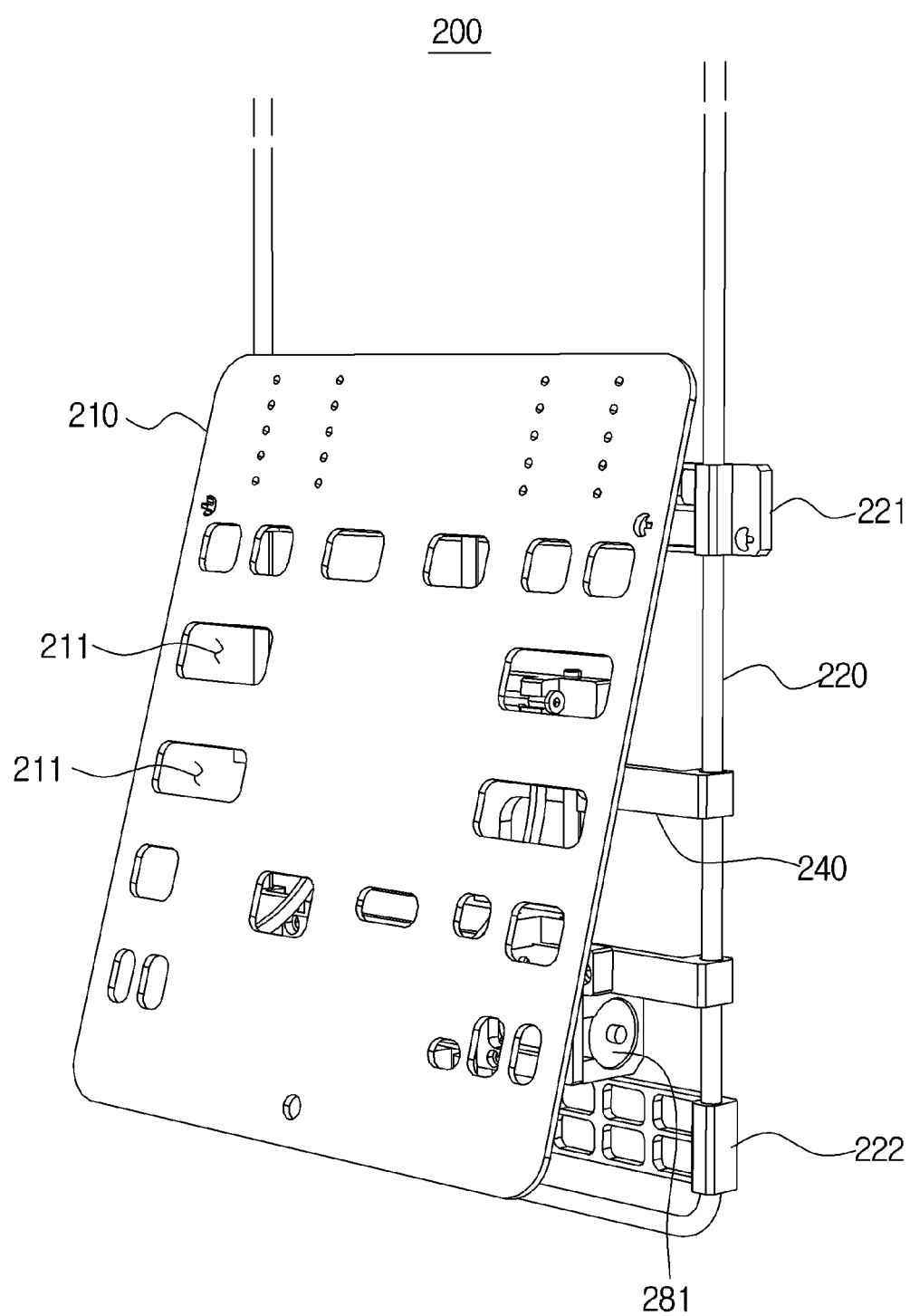
FIG. 8 is a schematic perspective view of a lumbar support for a vehicle seat according to a second embodiment of the present disclosure seen from the front.
Figure 9:
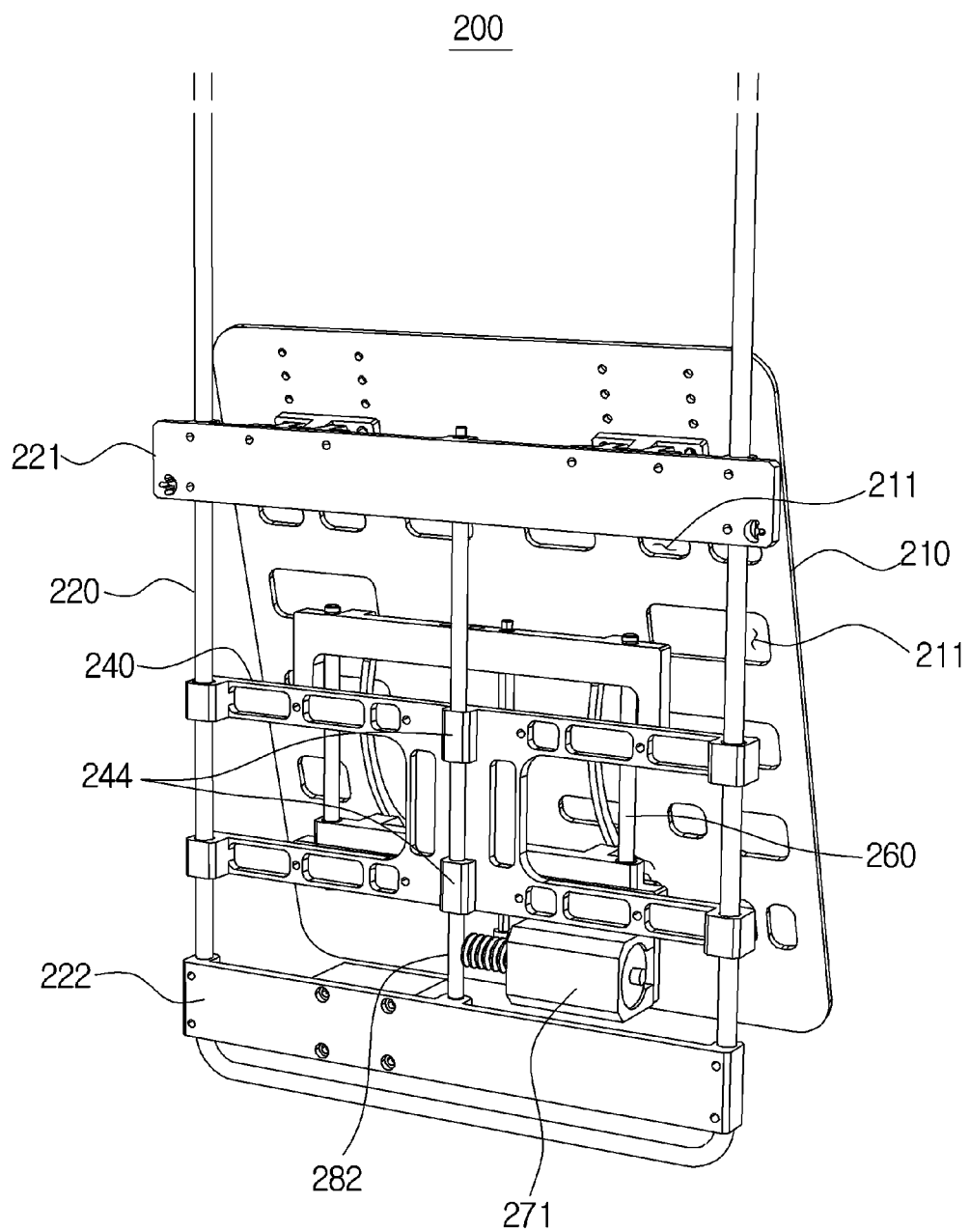
FIG. 9 is a schematic perspective view of the lumbar support for a vehicle seat of FIG. 8 seen from the rear.
Figure 10:
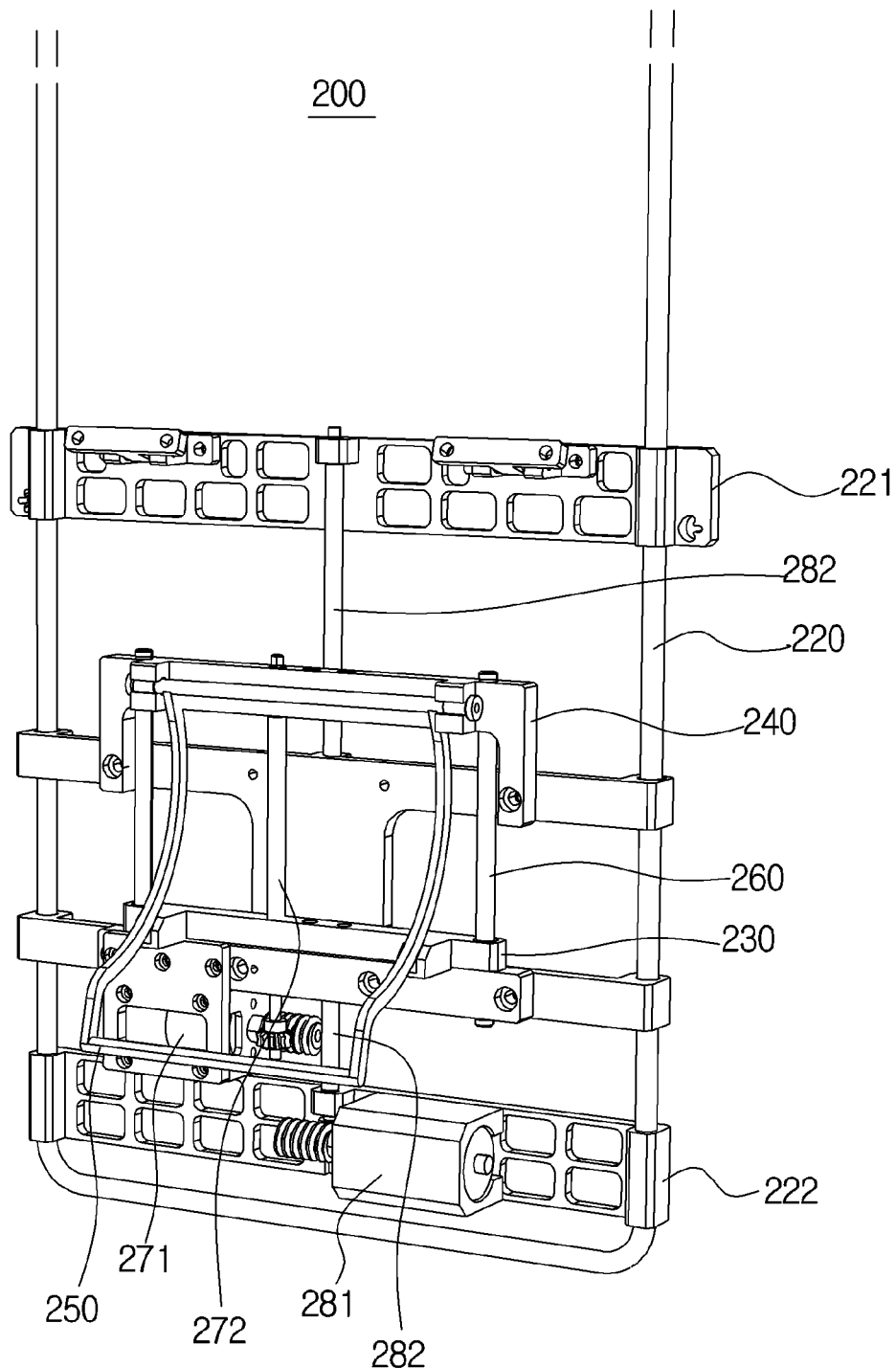
FIG. 10 is a schematic perspective view of the lumbar support for a vehicle seat of FIG. 8 with a support panel removed.

FIG. 8 is a schematic perspective view of a lumbar support for a vehicle seat according to an embodiment of the present disclosure seen from the front. FIG. 9 is a schematic perspective view of the lumbar support for a vehicle seat of FIG. 8 seen from the rear. FIG. 10 is a schematic perspective view of the lumbar support for a vehicle seat of FIG. 8 with a support panel removed.

Referring to FIGS. 8 to 10, a lumbar support 200 for a vehicle seat of the embodiment may include a support panel 210.

The support panel 210 can provide a supporting structure for supporting the user's lumbar vertebra or back. The support panel 210 may extend with a predetermined supporting surface to correspond to the user's lumbar vertebra or back.

In the embodiment, it is exemplified that the support panel 210 has a rectangular plate shape having a predetermined vertical height and lateral width. The support panel 210 may extend up/down and left/right to support the user's lumbar vertebra and back in contact with them with a sufficiently large area. This is for performing the conversion to be described below with a lumbar vertebra stably supported with a large contact area.

If necessary, a panel groove 210 may be formed at the support panel 211. The panel hole 211 may be formed through the support panel 110 in the thickness direction of the support panel 210. A plurality of panel holes 211 may be formed and may be appropriately spaced up and down or left and right on the plane of the support panel 210.

Preferably, the panel holes 211 may have a position, size, shape, etc. that can induce appropriate deformation of the support panel 210 to correspond to elastic deformation of the support panel 210 by a supporting rod 250 to be described below. However, the number, position, size, shape, etc. of the panel holes 211 may be appropriately changed, if necessary, and are not necessarily limited to the examples. Alternatively, depending on cases, the panel holes 211 may be replaced with shapes, materials, structures, etc. that can induce deformation of the support panel 210.

The support panel 210 may be made of an elastic member that can be partially or entirely deformed. Preferably, the entire support panel 210 may be made of one elastic material. The support panel 210 made of an elastic material can be elastically deformed by the supporting rod 250 to be described below. The support panel 210 entirely made of one elastic material reduces a sense of difference when the supporting rod 250 is rotated, thereby being able to contribute to achieving a smooth feeling of use.

The rear surface of the support panel 210 may be supported by the supporting rod 250 to be described below in a contact state. Accordingly, the support panel 210 elastically deforms to protrude at the position where it is supported by the supporting rod 250, thereby being able to provide a supporting force for the user's lumbar vertebra. When the supporting rod 250 is rotated, the support panel 210 may support different parts while changing the protruding position.

Meanwhile, the lumbar support 200 for a vehicle seat of the embodiment may include a first guide rod 220.

The first guide rod 220 may be disposed behind the support panel 210 and may provide a supporting structure for supporting the load of the support panel 210 and a user. The first guide rod 220 may be a rod or a frame extending in a predetermined shape.

In this embodiment, first guide rods 220 vertically extending a predetermined length are provided in a pair and spaced left and right apart from each other and the lower ends of the pair of rods are connected left and right, thereby forming a substantially U-shape. However, the structure, shape, etc. of the first guide rod 220 is not necessarily limited thereto, and the first guide rod 220 may be changed in various structures, shapes, etc. as long as they can appropriately perform the function of the first guide rod 120. Depending on cases, the first guide rod 220 may be replaced with a frame, a bracket, etc.

An upper frame 221 and a lower frame 222 are disposed at the upper and lower portions of the first guide rod 220, respectively. The upper frame 221 may have a predetermined height, may extend left and right, and may be fastened to the upper end portion of the first guide rod 220. The lower frame 222 may be disposed at a predetermined distance downward from the upper frame 221 and may be fastened to the lower end portion of the first guide rod 220.

The upper and lower frames 221 and 222 may provide a supporting structure on which components such as a rotary screw and a driving motor to be described below can be appropriately mounted and supported. The structure, shape, etc. of the upper and lower frames 221 and 222 are not necessarily limited to the examples, and, depending on cases, the upper and lower frames 221 and 222 may be partially or entirely integrated with the first guide rod 220.

Meanwhile, the lumbar support 200 for a vehicle seat of the embodiment may include a first link bracket 230.

The first link bracket 230 can support the supporting rod 250 to be described below from behind. When the first link bracket 230 is moved up and down, the supporting rod 250 supported in contact with the first link bracket 230 is rotated, whereby the protruding amount can be adjusted.

Figure 11:
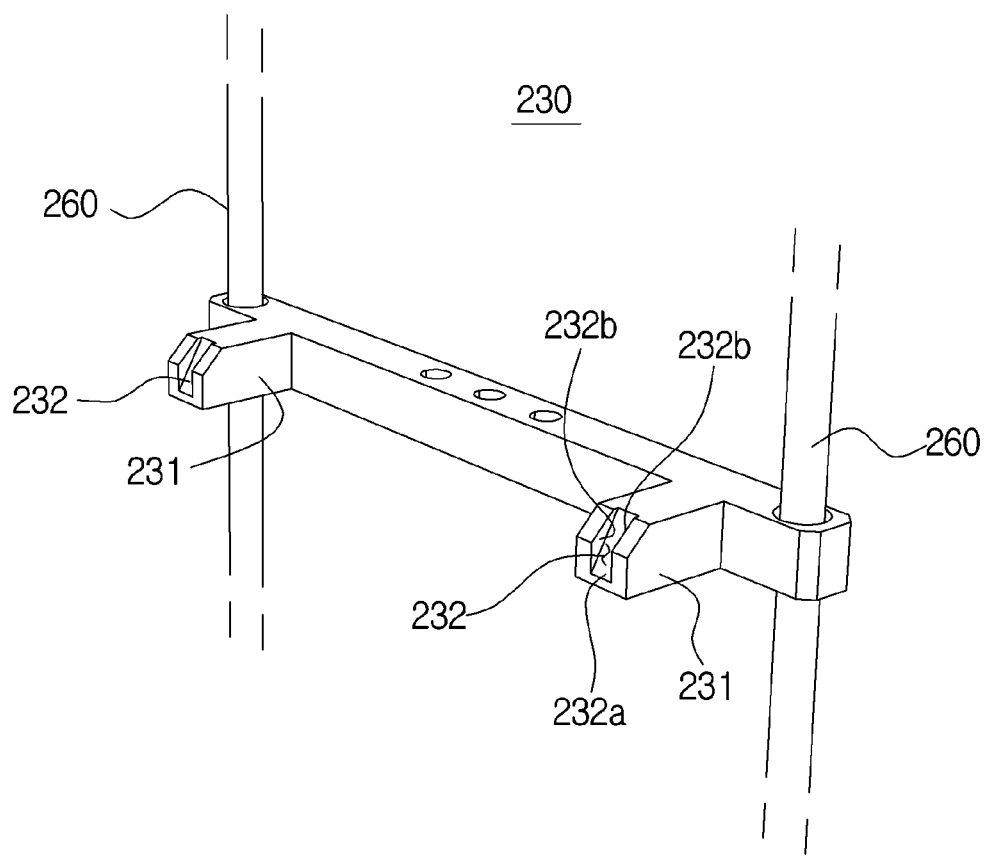
FIG. 11 is a schematic perspective view of a first link bracket shown in FIG. 8.

FIG. 11 is a schematic perspective view of a first link bracket shown in FIG. 8.

Referring to FIG. 11, the first link bracket 230 may extend a predetermined length left and right. The second guide rod 260 to be described below may be fastened to the left and right of the first link bracket 230, respectively. The second guide rods 260 are fastened vertically through the first link bracket 230, thereby being able to guide vertical movement of the first link bracket 230.

The first link bracket 230 may have a push protrusion 231. The push protrusion 231 may protrude forward by a predetermined amount from the front surface of the first link bracket 230. The push protrusion 231 may support the supporting rod 250 with the front surface in contact with the supporting rod 250.

A guide groove 232 may be formed on the front surface, which is in contact with the supporting rod 250, of the push protrusion 231. The guide groove 232 may extend downward forward from the front surface of the push protrusion 231. That is, the bottom 232a of the guide groove 232 may extend downward forward. Accordingly, the supporting rod 250 can be appropriately rotated in corresponding postures in accordance with the vertical position of the push protrusion 231.

Preferably, the guide groove 232 may extend while curving to correspond to the movement path of the supporting rod 250. That is, the bottom 232a of the guide groove 232 may be formed in a concavely curved shape corresponding to the movement path of the supporting rod 250. The guide groove 232 enables the supporting rod 250 and the push protrusion 231 to slide while maintaining a stable contact state.

The left and right sides 232b of the guide groove 232 may extend to correspond to the bottom 232a with the bottom 232a therebetween. The left and right sides 232b of the guide groove 232 may be disposed adjacent to the left and right sides of the supporting rod 250 and may guide movement of the supporting rod 250. The left and right sides 232b of the guide groove 232 may contribute to improving the feeling of operation by supporting lateral movement of the supporting rod 250.

The push protrusion 231 may be provided left and right in a pair with a gap therebetween. Preferably, the push protrusions 231 provided in a pair may be spaced a predetermined distance apart from each other left and right from a lateral center of the first link bracket 230. The push protrusions 231 provided in a pair support the supporting rod 250 at left and right supporting points in contact with the supporting rod 250, thereby being able to achieve a more stable supporting structure. While the stable supporting structure is maintained, the first link bracket 230 can be moved up and down or the supporting rod 250 can protrude (rotate), so a more comfortable and stable feeling of use can be achieved.

Referring to FIGS. 8 to 10, a lumbar support 200 for a vehicle seat of the embodiment may include a second link bracket 240.

The left and right ends of the second link bracket 240 are fastened to the first guide rods 220, respectively, so the second link bracket 140 can be guided up and down by the first guide rods 220. The second link bracket 240 can appropriately adjust the vertical positions where it supports a lumbar vertebra by moving up and down with the first link bracket 230.

Figure 12:
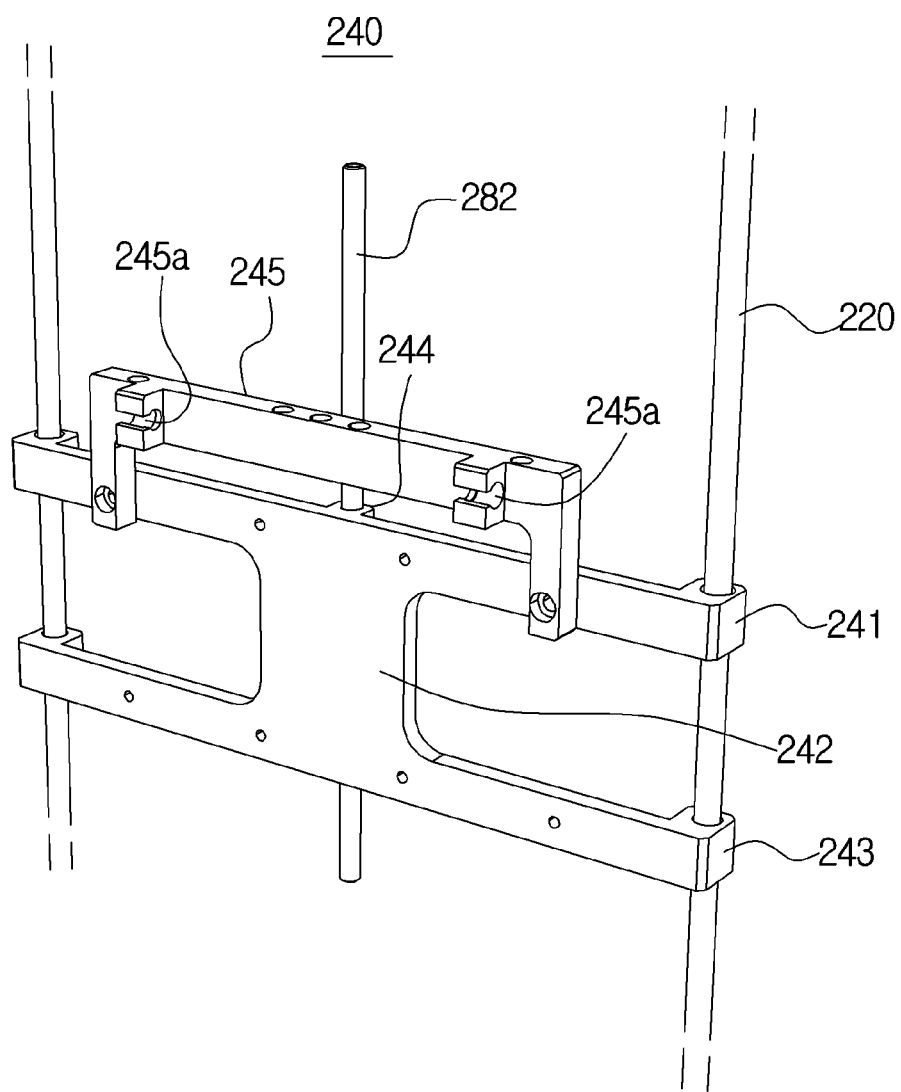
FIG. 12 is a schematic perspective view of a second link bracket shown in FIG. 8.

FIG. 12 is a schematic perspective view of the second link bracket shown in FIG. 8.

Referring to FIG. 12, the second link bracket 240 may include an upper link bracket 241, a connection bracket 242, and a lower link bracket 243.

The upper and lower link brackets 241 and 243 may be vertically spaced a predetermined gap apart from each other, and the connection bracket 242 may extend up and down between the upper and lower link brackets 241 and 243 and may connect the upper and lower link brackets 241 and 243. The connection bracket 242 may vertically extend with a predetermined lateral width substantially at the lateral center of the upper and lower link brackets 241 and 243. However, the detailed shape of the second link bracket 240 may be appropriately changed in various shapes other than the exemplified one as long as they have the functional conditions to be described below, and is not necessarily limited to the exemplified shape.

The left and right ends of the upper link bracket 241 may be fastened to the first guide rods 220, respectively. The first guide rods 220 are fastened vertically through the upper link bracket 241, thereby being able to guide vertical movement of the upper link bracket 241. Similarly, the lower link bracket 243 may be spaced a predetermined gap downward from the upper link bracket 241 with the left and right ends fastened to the first guide rods 220, respectively. Accordingly, the second link bracket 240 can be moved up and down with the left and right ends supported by the first guide rods 220 at the upper and lower positions. This structure enables the portion for supporting the lumbar vertebra to be moved with a stable supporting force secured in a larger area, so it is possible to achieve a feeling of smooth and stable operation.

A screw fastening bracket 244 may be disposed on the rear surface of the second link bracket 240 (see FIG. 9). The screw fastening bracket 244 may be disposed at the lateral center of the second link bracket 240 and may vertically extend a predetermined length. For reference, two screw fastening brackets 244 vertically spaced apart from each other are exemplified in this embodiment. A second rotary screw 282 to be described below may be thread-fastened vertically through the center of the screw fastening bracket 244. Accordingly, the screw fastening bracket 244 and the second link bracket 240 can be appropriately moved up and down by operation of the second rotary screw 282.

The screw fastening bracket 244 receives an operation force at vertically spaced two points with a sufficient supporting area secured with the second rotary screw 282. This configuration was designed in consideration of the second link bracket 240 supporting the lumbar vertebra or back of a user in a relatively large area and receiving relatively large load. That is, since the supporting rod 250 is rotated with the user's load sufficiently and stably supported by the screw fastening bracket 250, the lumbar support 200 for a vehicle seat of this embodiment can achieve a feeling of more smooth and stable operation.

The second link bracket 240 may include a rod fastening bracket 245. In this case, the rod fastening bracket 245 may be disposed over the upper link bracket 241. The rod fastening bracket 245 may be hinged to the supporting rod 250. To this end, the rod fastening bracket 245 may have a pair of left and right spaced rod fastening portions 245a. The rod fastening portions 245a may be hinged to the ends of the supporting rod 250. Accordingly, the supporting rod 250 can be rotated with a lateral hinge shaft.

Referring to FIGS. 8 to 10, the lumbar support 200 for a vehicle seat of the embodiment may include a supporting rod 250.

The supporting rod 250 is rotatably coupled to the second link bracket 240 and may be supported from behind by the first link bracket 230. In detail, the upper end of the supporting rod 250 may be fastened to the rod fastening portions 245a to be rotatable about the lateral axis. The supporting rod 250 may be supported in contact with the push protrusion 231 at a predetermined distance downward from the upper end. As described above, when the push protrusion 231 is provided left and right in a pair, the supporting rod 250 can be supported in contact with the first link bracket 230 at left and right positions.

The supporting rod 250 may be fastened to a guide groove 232 of the push protrusion 231. Accordingly, the transverse cross-section of the supporting rod 250 may have a shape corresponding to the guide groove 232. For example, the guide groove 232 may have a substantially rectangular shape, and the transverse cross-section of the supporting rod 250 may be formed in a rectangular shape corresponding thereto. The supporting rod 250 can slide in contact state between the guide grooves 232 when the first link bracket 230 is moved.

Figure 13:
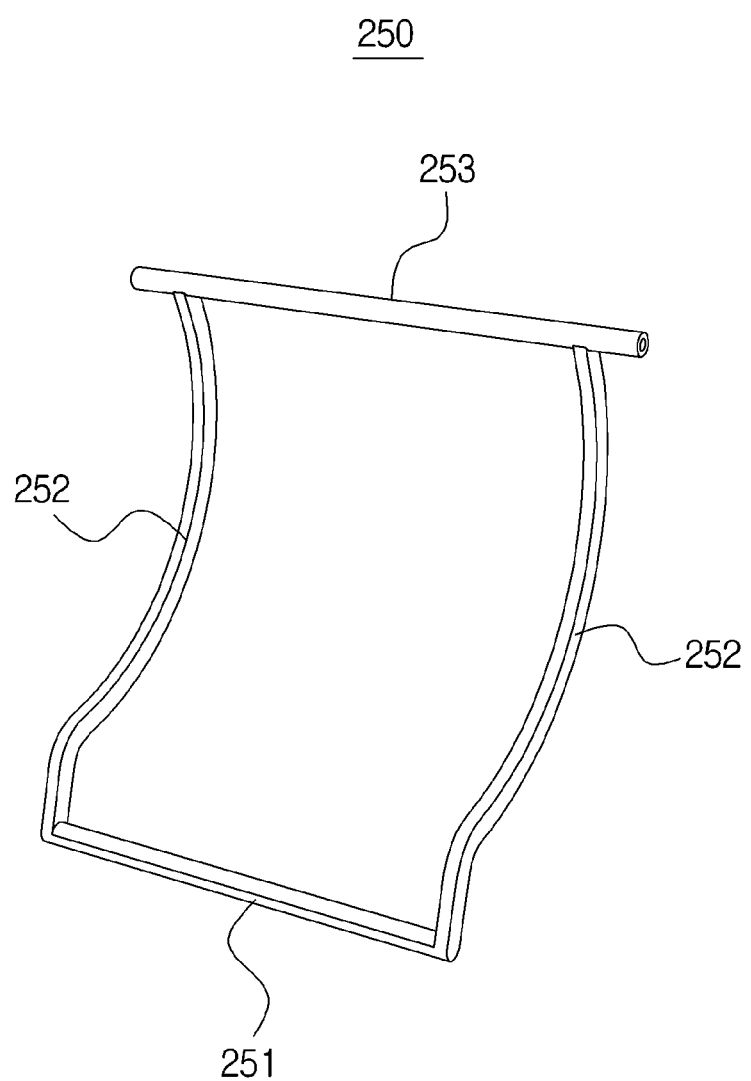
FIG. 13 is a schematic perspective view of a supporting rod shown in FIG. 8.

FIG. 13 is a schematic perspective view of the supporting rod shown in FIG. 8.

Referring to FIG. 13, the supporting rod 250 has a shape in which a rod longitudinally extending is curved in a predetermined shape. In detail, the supporting rod 250 may include a support rod 251 at the lower end, connection rods 252 extending upward from both ends of the support rod 251, and a hinge rod 253 at the upper ends of the connection rods 252.

The support rod 251 may laterally extend a predetermined length at the lower end of the supporting rod 250. The support rod 251 supports the rear surface of the support panel 210 in a contact state, thereby being able to provide a supporting force for the lumbar vertebra. The support rod 251 laterally a predetermined length and provides a supporting force for the lumbar vertebra in a wide lateral range so that a more comfortable and natural feeling of use can be achieved.

The connection rods 252 may substantially vertically extend from the left and right ends of the support rod 251. The connection rods 252 may be supported in contact with the guide grooves 232 of the push protrusion 231. If necessary, a sleeve-shaped additional material, surface treatment, coating, etc. for reducing friction with the push protrusion 231 may be applied to the connection rods 252.

The connection rods 252 may extend in a smooth curved shape with a predetermined curvature. The connection rods 252 may extend with a predetermined curvature about a virtual center point positioned ahead of the support panel 210. That is, the connection rods 252 may extend in a curved shape substantially protruding rearward. The connection rods 252 having this shape increases the front-rear movement of the support rod 251 due to the vertical movement of the first link bracket 230 so that the protruding amount can be more efficiently adjusted.

Though not shown, if necessary, a reinforcing rod may be added between the left and right connection rods 252. The reinforcing rod may laterally extend between the left and right connection rods 252. If necessary, a plurality of reinforcing rods may be provided and the reinforcing rods may be vertically spaced apart from each other on the connection rod 252. The reinforcing rod can increase the strength of the connection rods 252 in correspondence to use load.

The hinge rod 253 may laterally extend at the upper ends of the connection rod 252. An end of the hinge rod 253 may be hinged to the rod fastening portion 245a on a lateral axis, and similarly, the opposite end may be hinged to the other rod fastening portion 245a on a lateral hinge axis. Accordingly, the supporting rod 250 can rotate about a lateral hinge axis corresponding to the hinge rod 253.

The supporting rod 250 described above can be supported from behind by the push protrusion 231 of the first link bracket 230, and is rotated by a predetermined amount on the hinge rod 253 by vertical movement of the first link bracket 230, whereby the position can be adjusted. The supporting points of the connection rods 252 by the push protrusion 231 and the support rod 251 supporting the user's lumbar vertebra are spaced a predetermined gap apart from each other, and accordingly, a predetermined shock-absorbing effect can be achieved by elastic deformation of the supporting rod 250 itself.

Referring to FIGS. 8 to 10, the lumbar support 200 for a vehicle seat of the embodiment may include a second guide rod 260.

The second guide rod 260 may be formed in a rod shape vertically extending. The upper end of the second guide rod 260 may be fastened to the rod fastening bracket 245 and the lower end thereof may be fastened to the lower link bracket 243. That is, the second guide rod 260 can be fastened to and supported by the second link bracket 240.

The first link bracket 230 may be fastened to the second guide rod 260. The second guide rod 260 is fastened vertically through the first link bracket 230, whereby the first link bracket 230 can be guided up and down by the second guide rod 260.

The second guide rod 260 may be provided in a pair and spaced left and right apart from each other. Accordingly, the first link bracket 230 can be supported and guided up and down at both of the left and right sides by the second guide rods 260. Accordingly, the first link bracket 230 and the supporting rod 250 can be more stably and smoothly moved with the load of a user applied.

Meanwhile, the lumbar support 200 for a vehicle seat of the embodiment may include a first driving motor 271 and a first rotary screw 272.

The first driving motor 271 may be mounted and supported under the second link bracket 240. The first driving motor 271 may be moved up and down with vertical movement of the second link bracket 240. The first driving motor 271 is linked with the first rotary screw 272, thereby being able to rotate the first rotary screw 272. The first rotary screw 272 may be rotated forward or backward about the longitudinal axis by the first driving motor 271.

If necessary, the first driving motor 271 has an appropriate reducer on the rotary shaft thereof, thereby being able to transmit a driving force to the first rotary screw 272 through the reducer. For example, the first driving motor 271 may have a lateral rotary shaft, and a worm engaged with the first rotary screw 272 to transmit a driving force may be disposed at the end of the rotary shaft. This arrangement makes it possible to more easily dispose the first driving motor 271 and achieve a sufficient reduction ratio through the worm.

However, the first driving motor 271 may have various positions, power transmission structures, etc. other than the exemplified one as long as it can transmit appropriate torque to the first rotary screw 272, and is not necessarily limited to the exemplified arrangement, power transmission structure, etc.

The first rotary screw 272 may be fastened vertically through the first link bracket 230 substantially at the lateral center of the first link bracket 230. The first rotary screw 272 may be thread-fastened to the first link bracket 230. Accordingly, the first link bracket 230 may be moved up and down when the first rotary screw 272 is rotated forward or backward, whereby the position can be adjusted. The first link bracket 230 receives a driving force at the lateral center through the first rotary screw 272 and is guided up and down by the second guide rods 260 at the left and right sides, whereby it can be moved up and down while maintaining a stable supporting structure.

The first rotary screw 272 may vertically extend a predetermined length, and the lower end thereof may be connected to the first driving motor 271 to receive torque. An appropriate reducer, etc. may be provided, if necessary, between the lower end of the first rotary screw 272 and the first driving motor 271. The first rotary screw 272 may extend upward from the lower end and may be thread-fastened through the first link bracket 230, and may be fastened to the second link bracket 240 over the first link bracket 230. The first rotary screw 272 may be rotatably supported by the second link bracket 240 to be able to be appropriately rotated by the first driving motor 271.

Meanwhile, the lumbar support 200 for a vehicle seat of the embodiment may include a second driving motor 281 and a second rotary screw 282.

The second driving motor 281 may be disposed on the lower frame 222. Alternatively, the second driving motor 281 may be disposed at a predetermined position separated from the first and second link bracket 230 and 240. For example, the second driving motor 281, unlike that shown in the figures, may be disposed on the upper frame 221 or may be disposed at a side in the longitudinal direction of the second rotary screw 282 through a predetermined supporting structure. Similar to the first driving motor 271 described above, the second driving motor 281 has only to appropriately transmit torque to the second rotary screw 282 at a predetermined position separated from the first and second link brackets 230 and 240. If necessary, an appropriate reducer may be disposed on the rotary shaft of the second driving motor 281.

The second rotary screw 282 may be fastened vertically through the second link bracket 240 substantially at the lateral center of the second link bracket 240. As described above, a screw fastening bracket 244 may be disposed on the rear surface of the second link bracket 240, and the second rotary screw 282 may be fastened vertically through the screw fastening bracket 244. The second rotary screw 282 may be thread-fastened vertically through the screw fastening bracket 244.

The second rotary screw 282 may vertically extend a predetermined length, and the lower end thereof may be connected to the second driving motor 281 to receive torque. For reference, referring to the figures, the first rotary screw 272 is relatively short and disposed ahead of the second rotary screw 282, and the second rotary screw 282 is longer than the first rotary screw 272 and disposed behind the first rotary screw 272. The upper end of the second rotary screw 282 may be rotatably fastened to the center of the upper frame 221 and the lower end thereof may be rotatably fastened to the center of the lower frame 222. Accordingly, the second rotary screw 282 can be rotated while being appropriately supported at the upper and lower end support points and the middle portion fastened to the screw fastening bracket 244.

Figure 14:
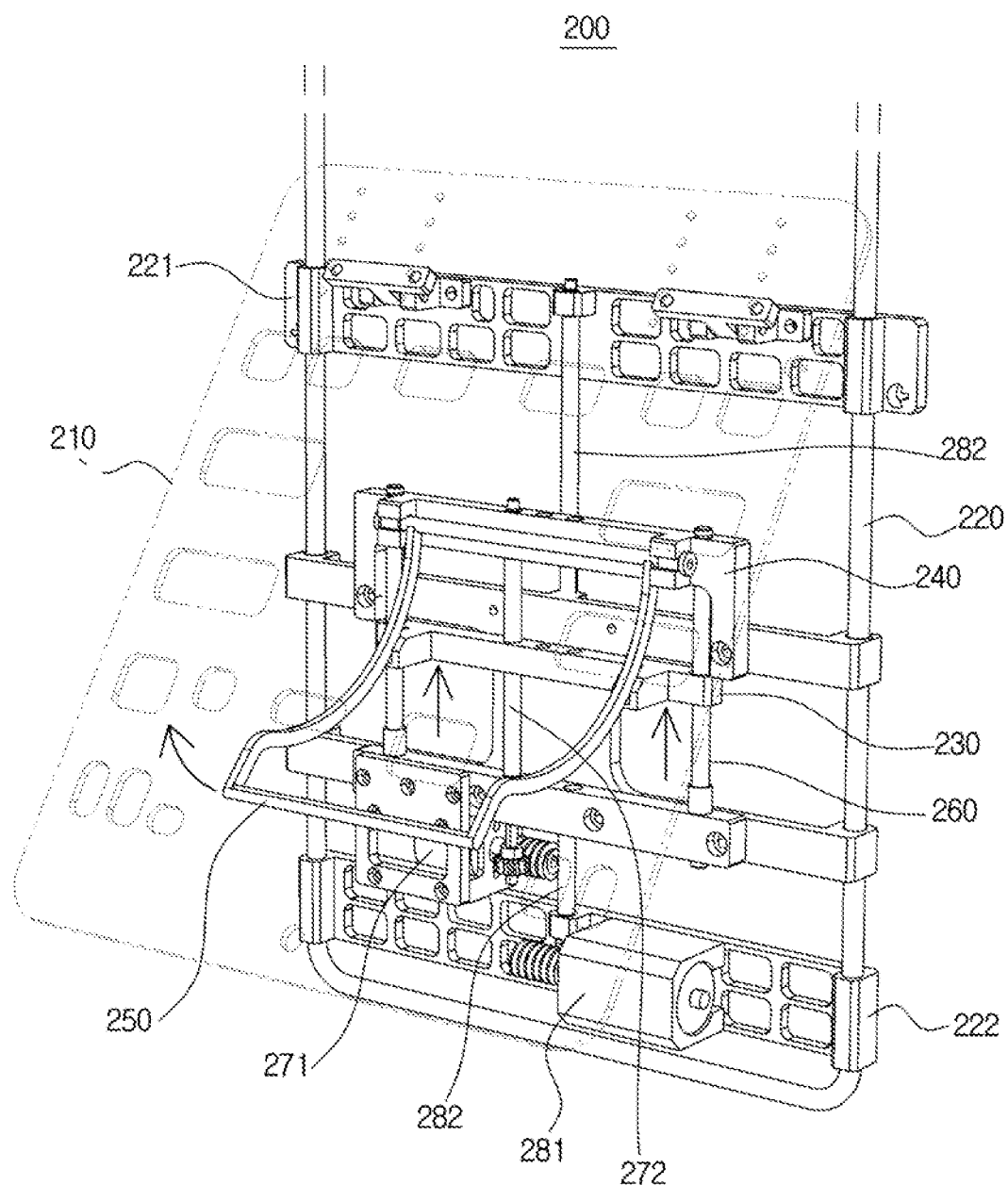
FIG. 14 is a first operation view showing adjustment of protruding amount of an operation block of the lumbar support for a vehicle seat shown in FIG. 10.

FIG. 14 is a first operation view showing adjustment of protruding amount of an operation block of the lumbar support for a vehicle seat shown in FIG. 10.

Referring to FIG. 14, the lumbar support 200 for a vehicle seat of this embodiment can rotate the supporting rod 250 and adjust the protruding amount for the portions supporting the lumbar vertebra by operating the first driving motor 271. The supporting rod 250 can increase the supporting force for a lumbar vertebra by protruding (rotating) forward or can decrease the supporting force by moving backward.

In detail, when the first driving motor 271 is driven forward, the first rotary screw 272 may rotate forward about the longitudinal axis. When the first rotary screw 272 is rotated forward, the first link bracket 230 thread-fastened thereto can be moved upward. In this process, only the first link bracket 230 can be moved upward with the second link bracket 240 vertically fixed.

When the first bracket 230 is moved upward, the inclined guide grooves 232 of the push protrusion 231 pushes up the supporting rod 250, whereby the supporting rod 250 can be rotated forward by a predetermined amount. That is, the supporting rod 250 is rotated forward, so the supporting force for the lumbar vertebra can be increased. When the first link bracket 230 is further moved upward along the inclined guide groove 232, the supporting rod 250 may be further rotated (protruded) forward. Accordingly, a user can appropriately change the protruding amount and the supporting force by adjusting the vertical position of the first link bracket 230.

The supporting rod 250 can perform adjustment of supporting force described above with the support rod 251 laterally extending and stably supporting the lumbar vertebra. The push protrusion 231 can achieve the rotation described above while moving upward along the connection rods 252. When the supporting rod 250 is rotated forward, the supporting points supported by the push protrusion 231 (over the connection rods 252) and the supporting points supporting the lumbar vertebra (the support rod 251 at the lower ends of the connection rods 252) can be spaced a predetermined gap apart from each other. Accordingly, it is possible to expect a shock-absorbing effect by the elasticity of the connection rods 252 and achieve a more comfort feeling of use.

When the first driving motor 271 is driven backward, the first rotary screw 272 can be rotated backward, whereby the first link bracket 230 can be moved downward. Further, the supporting rod 250 can be moved rearward by a predetermined amount, so the forward protruding amount decreases and the supporting force for the lumbar vertebra can be decreased. In this way, a user can appropriately adjust the supporting force for the lumbar vertebra by driving the first driving motor 271 forward or backward.

Figure 15:
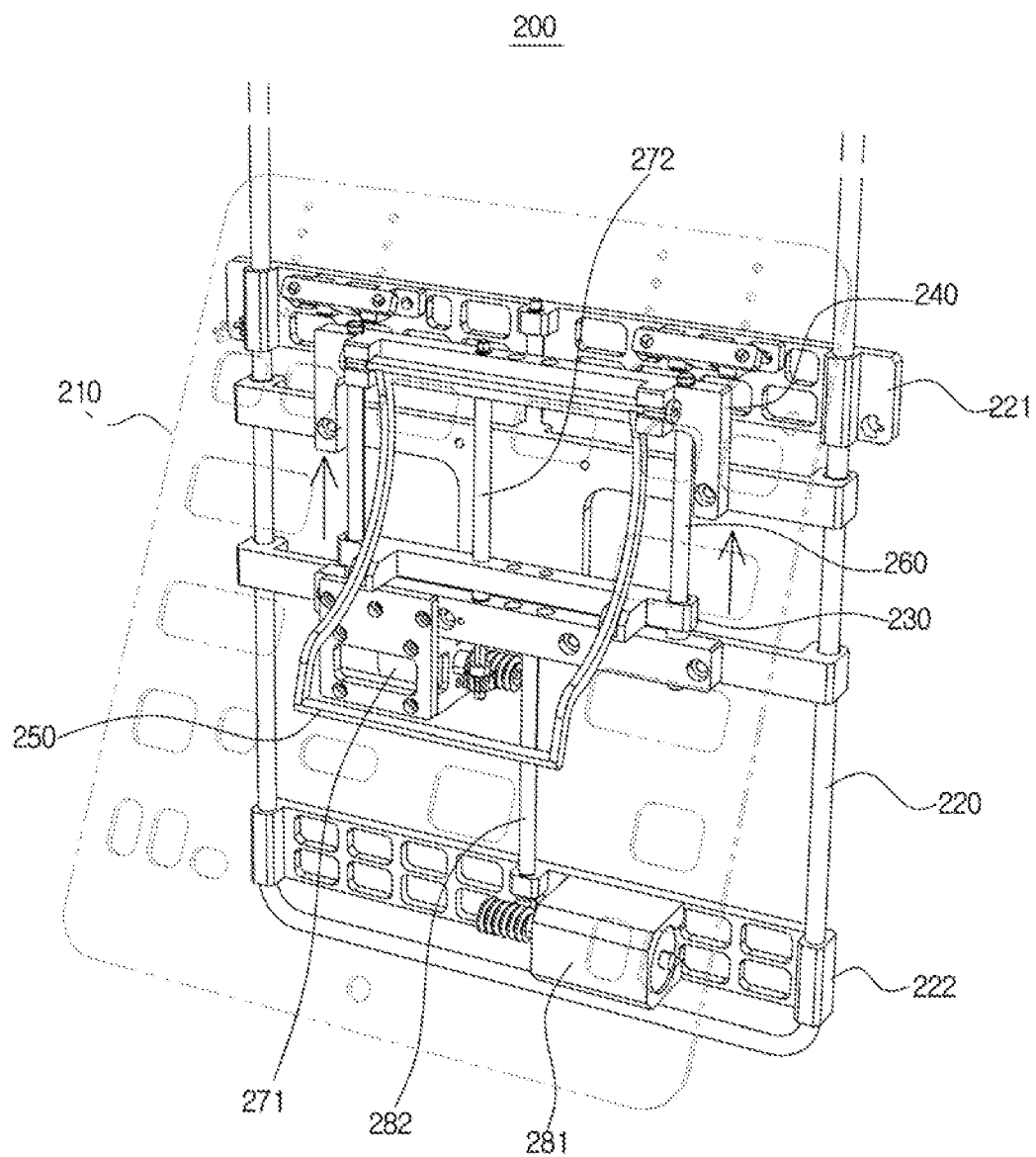
FIG. 15 is a second operation view showing up/down movement of an operation block of the lumbar support for a vehicle seat shown in FIG. 10.

FIG. 15 is a second operation view showing up/down movement of an operation block of the lumbar support for a vehicle seat shown in FIG. 10.

Referring to FIG. 15, the lumbar support 200 for a vehicle seat of this embodiment can vertically adjust the supporting positions by operating the second driving motor 281. The supporting rod 250 is moved up and down by the second driving motor 281 while maintaining the predetermined protruding amount, whereby the position thereof can be adjusted. Accordingly, a user can adjust the supporting position in accordance with the body shape, etc.

In detail, when the second driving motor 281 is rotated forward, the second rotary screw 282 may rotate forward about the longitudinal axis. When the second rotary screw 282 is rotated forward, the screw fastening bracket 244 and the second link bracket 240 that are thread-fastened thereto can be moved upward. The first link bracket 230 can be moved upward with the second link bracket 240, so the protruding amount of the supporting rod 250 can be maintained.

When the first link bracket 230 and the supporting rod 250 are moved upward, the supporting positions can be entirely moved upward. Similar to the adjustment of protruding amount described above, the supporting rod 250 is moved up and down with the support rod 251 laterally extending and stably supporting the lumbar vertebra, whereby a more comfort feeling of use can be achieved.

When the second driving motor 281 is driven backward, the second rotary screw 282 can be rotated backward, whereby the second link bracket 240 and the supporting rod 250 can be entirely moved downward. Accordingly, the supporting positions are moved downward, so it is possible to appropriately adjust the supporting positions in accordance with users.

As described above, the lumbar support 200 for a vehicle seat according to embodiments of the present disclosure can be installed at a seat of a vehicle and can provide an appropriate supporting force for the user's lumbar vertebra.

Further, the lumbar support 200 for a vehicle seat according to embodiments of the present disclosure can appropriately adjust the protruding amount or vertical position of the supporting portions in accordance with the body shape, posture, etc. of a user, which can contribute to improving the feeling of seating and convenience of use.

The lumbar support 200 for a vehicle seat according to embodiments of the present disclosure is configured such that the first link bracket 230 is guided by the left and right second guide rods 260 and receives an operation force through the first rotary screw 272 at the center and the second link bracket 240 is guided by the left and right second guide rods 260 and receives an operation force through the second rotary screw 282 at the center. Accordingly, the protruding amount or vertical position can be adjusted while a stably supported state is maintained and shaking or rattling is reduced when it is operated, so a smoother feeling of operation can be achieved.

The lumbar support 200 for a vehicle seat according to embodiments of the present disclosure can be moved up and down with the support rod 251 laterally extending and stably supporting the lumbar vertebra. Since the supporting points of the push protrusion 231 and the supporting points supporting the lumbar vertebra are spaced a predetermined gap apart from each other, a shock-absorbing effect by elasticity of the connection rods 252 can be achieved.

Although embodiments of the present invention were described above, those skilled in the art may change and modify the present invention in various ways by adding, changing, or removing components without departing from the spirit of the present invention described in claims, which should be understood as being included in the scope of the present invention.

The lumbar support for a vehicle seat according to embodiments of the present disclosure can be installed at a seat of a vehicle and can provide an appropriate supporting force for the user's lumbar vertebra.

Further, the lumbar support for a vehicle seat according to embodiments of the present disclosure can appropriately adjust the protruding amount or vertical position of the supporting portions in accordance with the body shape, posture, etc. of a user, which can contribute to improving the feeling of seating and convenience of use.

Further, the lumbar support for a vehicle seat according to embodiments of the present disclosure is configured such that the first link bracket is guided by the left and right second guide rods and receives an operation force through the first rotary screw at the center and the second link bracket is guided by the left and right second guide rods and receives an operation force through the second rotary screw at the center. Accordingly, the protruding amount or vertical position can be adjusted while a stably supported state is maintained and shaking or rattling is reduced when it is operated, so a smoother feeling of operation can be achieved.

In the lumbar support for a vehicle seat according to embodiments of the present disclosure, the protruding amount or vertical position can be adjusted with the pair of left and right operation blocks supporting the corresponding portions except for the lumbar vertebra at the center, so it is possible to reduce the sense of difference and achieve a more comfortable feeling of use when adjusting the vertical position.

The lumbar support for a vehicle seat according to embodiments of the present disclosure can be moved up and down with the support rod laterally extending and stably supporting the lumbar vertebra. Since the supporting points of the push protrusion and the supporting points supporting the lumbar vertebra are spaced a predetermined gap apart from each other, a shock-absorbing effect by elasticity of the connection rods can be achieved.

Technical effects that can be achieved through embodiments of the present disclosure are not necessarily limited to the effects described above. Other effects not stated here may be clearly understood to those skilled in the art from other descriptions in the specification including the detailed description.

What is claimed is:

1. A lumbar support for a vehicle seat, comprising:
a support panel made of an elastic material and supporting a user's lumbar vertebra;
a first guide rod supporting the support panel;
a second link bracket fastened to the first guide rod to be movable up and down;
a first link bracket disposed under the second link bracket to be movable up and down with respect to the second link bracket, and having an operation block providing a supporting force to the lumbar vertebra;
a first rotary screw vertically extending, thread-fastened to the first link bracket, and moving up and down the first link bracket by rotating about a longitudinal axis; and
a second rotary screw vertically extending, thread-fastened to the second link bracket, and moving up and down the second link bracket by rotating about a longitudinal axis,
wherein the second link bracket includes:
an upper link bracket of which left and right sides are fastened to the first guide rod to be movable up and down;
a lower link bracket spaced a predetermined gap downward apart from the upper link bracket and fastened to the first guide rod to be movable up and down; and
a connection bracket extending between the upper link bracket and the lower link bracket.

2. The lumbar support of claim 1, wherein
the second link bracket includes a screw fastening bracket vertically extending at a lateral center of the second link bracket to correspond to a longitudinal direction of the second rotary screw, and having the second rotary screw thread-fastened therein.

3. The lumbar support of claim 1, wherein
the operation block has a lower end hinged to the first link bracket to be able to rotate about a lateral axis, is interfered with by a push protrusion provided at the second link bracket such that a forward protruding amount is adjusted when the first link bracket is moved up and down, and is provided left and right in a pair with a gap therebetween.

4. The lumbar support of claim 3, wherein
the operation block forms a contact surface inclined downward rearward and is in contact with the push protrusion.

5. A lumbar support for a vehicle seat, comprising:
a support panel made of an elastic material and supporting a user's lumbar vertebra;
a first guide rod supporting the support panel;
a second link bracket fastened to the first guide rod to be movable up and down;
a first link bracket disposed under the second link bracket to be movable up and down with respect to the second link bracket, and having an operation block providing a supporting force to the lumbar vertebra;
a first rotary screw vertically extending, thread-fastened to the first link bracket, and moving up and down the first link bracket by rotating about a longitudinal axis;
a second rotary screw vertically extending, thread-fastened to the second link bracket, and moving up and down the second link bracket by rotating about a longitudinal axis; and
a second guide rod provided in a pair at left and right sides of the second link bracket, fastened to left and right sides of the operation block to be able to slide, and guiding vertical movement of the operation block,
wherein the first rotary screw is thread-fastened to a lateral center of the first link bracket between the pair of second guide rods.

6. The lumbar support of claim 1, comprising:
an upper frame fastened to an upper portion of the first guide rod and rotatably supporting an upper end of the second rotary screw;
a lower frame spaced downward apart from the upper frame, fastened to a lower portion of the first guide rod, and rotatably supporting a lower end of the second rotary screw;
a first driving motor having a lateral rotary shaft, supported at a lower portion of the second link bracket, and providing torque to the first rotary screw through a reducer; and
a second driving motor having a lateral rotary shaft, supported on the lower frame, and providing torque to the second rotary screw through a reducer.

7. A lumbar support for a vehicle seat, comprising:
a support panel made of an elastic material and supporting a user's lumbar vertebra;
a first guide rod supporting the support panel;
a second link bracket fastened to the first guide rod to be movable up and down;
a supporting rod rotatably fastened to the second link bracket;
a first link bracket supported at the second link bracket to be movable up and down, supporting the supporting rod from behind, and adjusting a rotation position of the supporting rod;
a first rotary screw vertically extending, thread-fastened to the first link bracket, and moving up and down the first link bracket by rotating about a longitudinal axis; and
a second rotary screw vertically extending, thread-fastened to the second link bracket, and moving up and down the second link bracket by rotating about a longitudinal axis,
wherein the second link bracket includes:
an upper link bracket of which left and right sides are fastened to the first guide rod to be movable up and down;
a lower link bracket spaced a predetermined gap downward apart from the upper link bracket and fastened to the first guide rod to be movable up and down; and
a connection bracket extending between the upper link bracket and the lower link bracket.

8. The lumbar support of claim 7, wherein
the second link bracket includes:
a screw fastening bracket vertically extending at a lateral center of the second link bracket to correspond to a longitudinal direction of the second rotary screw, and having the second rotary screw thread-fastened therein; and
a rod fastening bracket disposed over the upper link bracket and supporting a pair of left and right rod fastening portions to which the supporting rod is hinged.

9. The lumbar support of claim 7, wherein
the supporting rod includes:
a support rod laterally extending and supporting a rear surface of the support panel;

connection rods vertically extending a predetermined length from left and right ends of the support rod, and supported from behind by the first link bracket; and a hinge rod laterally extending at upper ends of the connection rods and hinged to the second link bracket with a lateral direction as an axis.

10. The lumbar support of claim 9, wherein the first link bracket includes a pair of push protrusions supporting the connection rods from behind and spaced left and right apart from each other to adjust a rotation position of the supporting rod by moving up and down along the connection rods.

11. The lumbar support of claim 10, wherein the push protrusions are inclined downward forward and have a guide groove concavely formed to be able to prevent lateral separation of the connection rods.

12. The lumbar support of claim 7, further comprising a second guide rod provided in a pair at left and right sides of the second link bracket, fastened to left and right sides of the first link bracket to be able to slide, and guiding vertical movement of the first link bracket, wherein the first rotary screw is thread-fastened to a lateral center of the first link bracket between the pair of second guide rods.

13. The lumbar support of claim 7, wherein an upper frame fastened to an upper portion of the first guide rod and rotatably supporting an upper end of the second rotary screw;

a lower frame spaced downward apart from the upper frame, fastened to a lower portion of the first guide rod, and rotatably supporting a lower end of the second rotary screw;

a first driving motor having a lateral rotary shaft, supported at a lower portion of the second link bracket, and providing torque to the first rotary screw through a reducer; and a second driving motor having a lateral rotary shaft, supported on the lower frame, and providing torque to the second rotary screw through a reducer.

\* \* \* \* \*